(12) United States Patent
Meissner et al.

(10) Patent No.: US 12,474,350 B2
(45) Date of Patent: **\*Nov. 18, 2025**

(54) LOW ENERGY CLEAVABLE MASS TAG FOR QUANTITATIVE PROTEOMICS

(71) Applicant: Bruker Switzerland AG, Faellanden (CH)

(72) Inventors: Felix Meissner, Berlin (DE); Matthias Mann, Munich (DE); Florian Meier, Pullach (DE); Sebastian Virreira Winter, Munich (DE); Arturo Zychlinsky, Berlin (DE)

(*) Notice: Subject to any disclaimer, the term of this patent is extended or adjusted under 35 U.S.C. 154(b) by 1610 days.

This patent is subject to a terminal disclaimer.

(21) Appl. No.: 16/349,363

(22) PCT Filed: Nov. 14, 2017

(86) PCT No.: PCT/EP2017/079211
§ 371 (c)(1),
(2) Date: May 13, 2019

(87) PCT Pub. No.: WO2018/087397
PCT Pub. Date: May 17, 2018

(65) Prior Publication Data
US 2019/0369112 A1 Dec. 5, 2019

(30) Foreign Application Priority Data
Nov. 14, 2016 (EP) .................................. 16198748

(51) Int. Cl.
*C07C 317/04* (2006.01)
*C07D 211/94* (2006.01)
*G01N 33/68* (2006.01)

(52) U.S. Cl.
CPC ....... *G01N 33/6848* (2013.01); *C07C 317/04* (2013.01); *C07D 211/94* (2013.01)

(58) Field of Classification Search
CPC ............................ C07D 211/94; C07C 317/04
See application file for complete search history.

(56) References Cited

U.S. PATENT DOCUMENTS

| | | | |
|---|---|---|---|
| 11,355,330 B2* | 6/2022 | Meissner | H01J 49/0036 |
| 2010/0286927 A1 | 11/2010 | Horn et al. | |
| 2011/0143951 A1 | 6/2011 | Thompson | |
| 2013/0043384 A1 | 2/2013 | Matsumoto et al. | |

FOREIGN PATENT DOCUMENTS

| | | |
|---|---|---|
| JP | 2009523234 A | 6/2009 |
| JP | 2009524688 A | 7/2009 |
| JP | 2010520999 A | 6/2010 |
| JP | 2010521681 A | 6/2010 |
| JP | 2011-503553 A | 1/2011 |
| WO | 2007079589 A1 | 1/2007 |
| WO | WO 2007087534 A2 | 8/2007 |
| WO | WO 2008110581 A2 | 9/2008 |
| WO | 2008116283 A1 | 10/2008 |
| WO | 2009/061904 A1 | 5/2009 |
| WO | 2011/136237 A1 | 11/2011 |

OTHER PUBLICATIONS

Office Action issued in Japanese Patent Application No. 2019-524885; drafted on Jun. 13, 2022; dispatched on Jun. 15, 2022.
Translation of Office Action issued in Japanese Patent Application No. 2019-524885.
Communication pursuant to Article 94(3) EPC issued by the European Patent Office (EPO) in European Patent Application No. 17 801 427.0 on Mar. 20, 2023.
Virreira Winter, S. et al. "EASI-tag enables accurate multiplexed and interference-free MS2-based proteome quantification." Nature Methods Jul. 2018; vol. 15, No. 7, pp. 527-530. DOI: 10.1038/s41592-018-0037-8 Epub Jun. 18, 2018; Published Jul. 2018.
Stadlmeier M. et al. "A Sulfoxide-Based Isobaric Labelling Reagent for Accurate Quantitative Mass Spectrometry", Angewandte Chemie International Edition, vol. 57, No. 11, pp. 2958-2962. DOI: 10.1002/anie.201 708867 Version of Record Online: Feb. 15, 2018; Issue Online: Mar. 1, 2018.
Suneel P. Singh et al, "Nucleophilic attack of 2-sulfinyl acrylates: A mild and general approach to sulfenic acid anions", Organic & Biomolecular Chemistry, vol. 8, No. 7, Jan. 1, 2010 (Jan. 1, 2010), p. 1712, DOI: 10.1039/b917217c.
Wynne V. Kandur et al, "Design of CID-cleavable protein cross-linkers: identical mass modifications for simpler sequence analysis", Organic & Biomolecular Chemistry, vol. 13, No. 38, Aug. 13, 2015 (Aug. 13, 2015), p. 9793-9807 DOI: 10.1039/C5OB01410G.
Anastasia Kalli et al, "Evaluation and Optimization of Mass Spectrometric Settings during Data-dependent Acquisition Mode: Focus on LTQ-Orbitrap Mass Analyzers", Journal of Proteome Research., vol. 12, No. 7, May 5, 2013 (May 5, 2013), p. 3071-3086 DOI: 10.1021/pr3011588.
Silveira Joshua A et al, "Parallel accumulation for 100% duty cycle trapped ion mobility-mass spectrometry", International Journal of Mass Spectrometry, Elsevier Science Publishers, Amsterdam, NL, vol. 413, Mar. 14, 2016 (Mar. 14, 2016), p. 168-175 DOI: 10.1016/J.IJMS.2016.03.004.
Office Action issued in Japanese Patent Application No. 2019-524885; drafted on Aug. 19, 2021; dispatched on Aug. 27, 2021.

(Continued)

*Primary Examiner* — Sun Jae Yoo
(74) *Attorney, Agent, or Firm* — Perdue IP Law, APC; Donna O. Perdue

(57) ABSTRACT

The present invention relates to a compound which comprises or consists of (a) a reactive moiety, said reactive moiety being capable of reacting with a functional group of a peptide to form a covalent bond; and covalently joined thereto (b) a moiety which fragments in the mass spectrometer (i) at an energy below the energy required for fragmenting peptides and/or a higher conversion rate than peptides; and (ii) at said energy according to (i) and when coupled to a peptide via said reactive group, at a single site within said compound coupled to a peptide, to yield a first moiety and a second moiety, said second moiety being coupled to said peptide.

5 Claims, 28 Drawing Sheets

(56) References Cited

OTHER PUBLICATIONS

Figure 1:
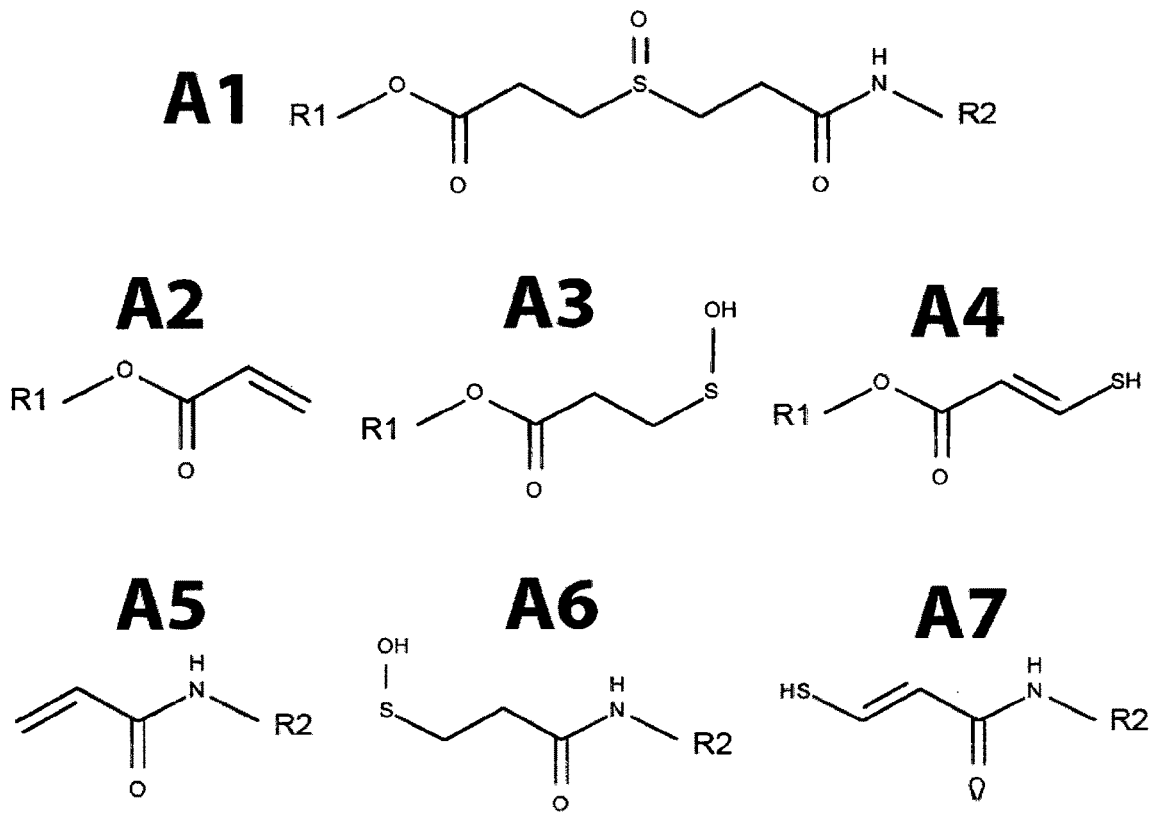
Figure 1:
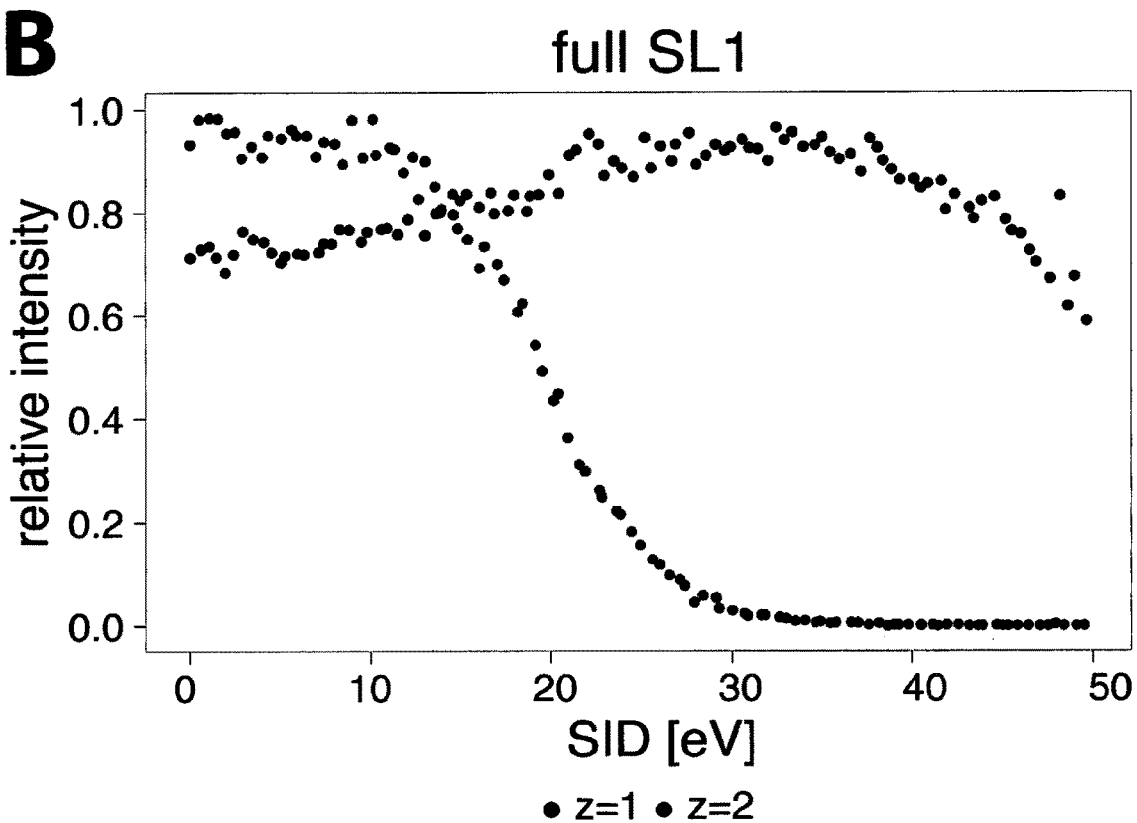
Figure 1:
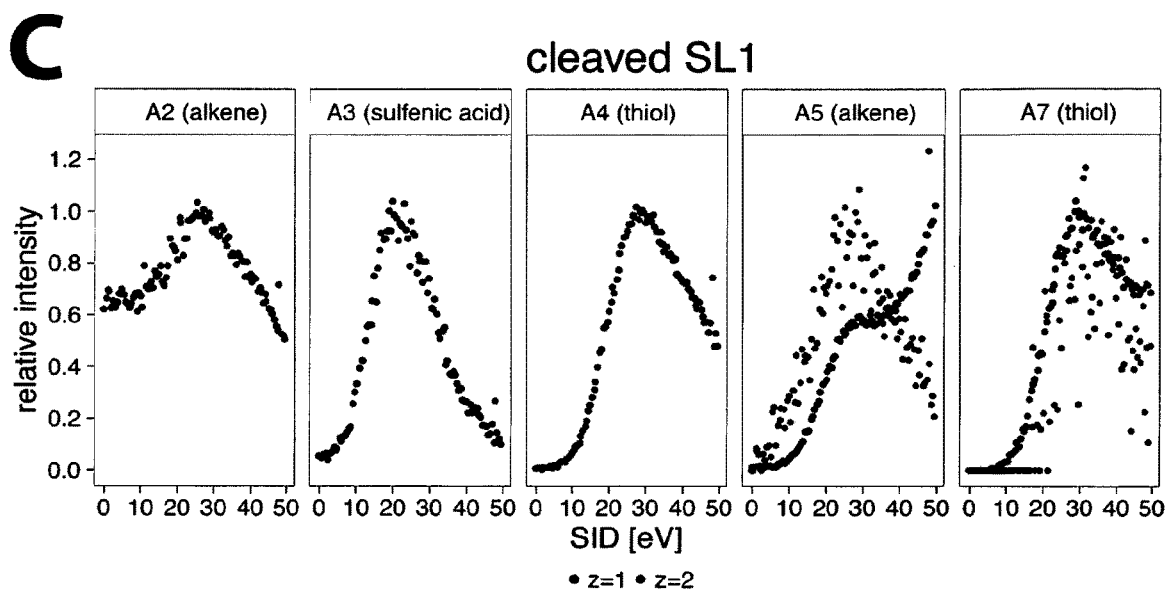

Thomas, M. A., Buelow, B. J., Nevins, A. M., Jones, S. E., Peterson, F. C., Gundry, R. L., Grayson, M. H., & Volkman, B. F. (2015). "Structure-function analysis of CCL28 in the development of post-viral asthma." The Journal of Biological Chemistry, 290(7), 4528-4536. Feb. 13, 2015, doi: 10.1074/jbc.M114.627786.

Seeley, K. W., Fertig, A. R., Dufresne, C. P., Pinho, J. P., & Stevens, S. M., Jr (2014). "Evaluation of a method for nitrotyrosine site identification and relative quantitation using a stable isotope-labeled nitrated spike-in standard and high resolution fourier transform MS and MS/MS analysis." International Journal of Molecular Sciences, 15(4), 6265-6285. Apr. 15, 2014, doi: 10.3390/ijms15046265.

Panchaud, Alexandre et al. "Faster, Quantitative, and Accurate Precursor Acquisition Independent From Ion Count" Analytical Chemistry vol. 83, No. 6, Mar. 15, 2011, pp. 2250-2257 US ISSN: 0003-2700 DOI: https://doi.org/10.1021/ac103079q.

Panchaud, Alexandre et al. "Supporting information S-1 PacIFIC goes faster, quantitative and accurate", Analytical Chemistry, vol. 83, No. 6, Mar. 15, 2011, pp. 2250-2257, Retrieved from the Internet: URL:https://pubs.acs.org/doi/suppl/10.1021/acl03079q/suppl_file/ac103079q_si_001.pdf.

\* cited by examiner

A8

A9

A10

A11

B

D

A

ASL2

Isotope coding
A) 2x C12
B) 1x C12, 1x C13
C) 2x C13

Isotope coding
A) 2x C13
B) 1x C12, 1x C13
C) 2x C12

E

A

B

C

LOW ENERGY CLEAVABLE MASS TAG FOR QUANTITATIVE PROTEOMICS

CROSS-REFERENCE TO RELATED APPLICATIONS

This application is a national stage application under 35 U.S.C. § 371, of International Application No. PCT/EP2017/079211, filed Nov. 14, 2017, which claims benefit of priority to EP Patent Application No. 16 19 8748.2, filed Nov. 14, 2016, each of which is incorporated herein by reference in its entirety.

The present invention relates to a compound which comprises or consists of (a) a reactive moiety, said reactive moiety being capable of reacting with a functional group of a peptide to form a covalent bond; and covalently joined thereto (b) a moiety which fragments in the mass spectrometer (i) at an energy below the energy required for fragmenting peptides and/or a higher conversion rate than peptides; and (ii) at said energy according to (i) and when coupled to a peptide via said reactive group, at a single site within said compound coupled to a peptide, to yield a first moiety and a second moiety, said second moiety being coupled to said peptide.

In this specification, a number of documents including patent applications and manufacturer's manuals are cited. The disclosure of these documents, while not considered relevant for the patentability of this invention, is herewith incorporated by reference in its entirety. More specifically, all referenced documents are incorporated by reference to the same extent as if each individual document was specifically and individually indicated to be incorporated by reference.

Mass spectrometry (MS) is an analytic method which permits to (i) quantify and/or (ii) identify analytes. For the purpose of enhancing throughput and/or a direct comparison between two and more samples, samples of different origin may be combined. In such an experimental setup, it is important to be able to determine in the mass spectrum which peaks originate from which sample, and furthermore to determine which amounts of a given analyte are present in the individual samples prior to pooling them. As regards the identification aspect, this is typically done, especially in the field of proteins and peptides, by operating the mass spectrometer in a mode which provides for fragmenting of the proteinaceous analytes.

Isobaric labeling is an art-established method for quantitative proteomics. When used in conjunction with the above mentioned pooling of samples, each individual sample is labeled with a different mass tag. Said mass tags are isobaric which means that they have the same mass. In addition to being isobaric, said mass tags contain a fragmenting site. A fragmenting site divides the mass tag into a first and a second moiety. The first moiety is also referred to as "reporter moiety", and the second moiety as "balance moiety". While a set of isobaric mass tags contains by definition tags of the same mass, this does not apply to the individual reporter and balance tags comprised in said set of mass tags. By using a differential isotope labeling scheme, each reporter and each balance moiety have its individual mass which allows to identify the origin of a signal and assigning it to the sample from which it originates. The balance moiety remains attached to the analyte or a fragment thereof. The compound consisting of analyte (or fragment thereof) and balance moiety is also referred to as complementary fragment or complementary ion.

The art-established isotopic mass tags fragment at an energy where also peptides and polypeptides fragment. This allows to perform a quantification and identification at the same point in time: upon fragmenting, reporter moiety and/or balance moiety permit to determine the origin of a signal and to quantify its amount; and the fragments obtained from the analyte itself permit to determine its identity.

While this approach has the mentioned advantages, the present inventors recognized certain disadvantages. In particular, both the accuracy and precision are undermined by interfering peptide ions that co-isolate and co-fragment with the target peptide. Additional gas-phase isolation steps, such as proton-transfer ion-ion reactions and higher-order MS3 scans try to address these issues, but these methods come at the expense of decreased acquisition speed and sensitivity (Ow, S. Y., et al., J Proteome Res, 2009. 8(11): p. 5347-55; Wenger, C. D., et al., Nat Methods, 2011. 8(11): p. 933-5). Quantification of labeled peptides on the MS2 level based on the fragment ions that carry the TMT mass balancer, provide an alternative since these complement TMT ($TMT^c$) ions are precursor-specific and unaffected by co-eluting peptides (Wuhr, M., et al., Anal Chem, 2012. 84(21): p. 9214-21). Unlike the PTR or MS3 strategies, this method can be implemented on a wide range of high-resolution mass spectrometers like the quadrupole Orbitrap instruments (QExactive). However, a current limitation of this method is that complementary ion formation is inefficient for a large fraction of peptides, particularly those with higher charge states and high-mobility protons. Moreover, due to co-isolation of the peptide isotope cluster, $TMT^c$ ions interfere and compromise quantification.

In view of the limitations of the prior art, the technical problem underlying the present invention can be seen in the provision of improved means and methods of isobaric labeling for mass spectrometry.

This technical problem has been solved by the claims enclosed herewith. Accordingly, in a first aspect, the present invention relates to a compound which comprises or consists of (a) a reactive moiety, said reactive moiety being capable of reacting with a functional group of a peptide to form a covalent bond; and covalently joined thereto (b) a moiety which fragments in the mass spectrometer (i) at an energy below the energy required for fragmenting peptides and/or a higher conversion rate than peptides; and (ii) at said energy according to (i) and when coupled to a peptide via said reactive group, at a single site within said compound coupled to a peptide, to yield a first moiety and a second moiety, said second moiety being coupled to said peptide.

The compound in accordance with the first aspect is designed for being covalently joined to a peptide, polypeptide or protein. This is implemented by requirement (a). A number of chemistries for coupling a compound to a peptide are available and known to the skilled person. Preferred and/or exemplary solutions to that end will be disclosed in further detail below. A preferred functional group of a peptide, polypeptide or protein which is capable of reacting with a reactive moiety in accordance with the first aspect is an amino group, for example the N-terminal main chain amino group of a peptide, polypeptide or protein or a side chain amino group. Accordingly, a preferred reactive moiety is an amine-reactive moiety.

Upon reacting with an analyte, more specifically a peptide, a compound-peptide conjugate is formed. Upon fragmentation at said single site, said compound-peptide conjugate yields said first moiety and a second conjugate. The second conjugate is a conjugate of said peptide with the remaining part of said compound of the invention (second moiety) after loss of said first moiety. If a plurality of peptides is derivatized with the same compound in accordance with the invention, fragmentation will yield a plurality of second conjugates. These second conjugates have a constant and a variable part. The variable part is determined by the specific peptide comprised in a specific second moiety, and the constant part is that component of the second conjugate which originates from a compound of the invention. This part is herein also referred to as constant part of the second conjugate. In the art, and in relation to isobaric tags which are distinct from the isobaric tags of the present invention, the constant part is also referred to as "balancing moiety". The second moiety or constant part is constant in the sense that it has always the same chemical structure for a given compound in accordance with the first aspect. As regards isotopic substitution, it is understood that within a set of compounds of the invention having the same structure, for example within a kit in accordance with the present invention, said second moieties or constant parts differ from each other with regard their isotopic substitution, the consequence being that different second moieties within such set of compounds or within a kit of the invention have different masses, at least different exact masses and preferably also different nominal masses. In terms of structure, the second moiety constant part is generally that part of a compound of the invention which begins with the cleavable bond and ends with the atom preceding the first atom of the analyte or peptide in said second conjugate. Under certain circumstances, a loss of a proton, hydrogen or water or the like may occur.

Covalently joined to said reactive moiety, said compound furthermore comprises or additionally consists of a moiety which fragments in the mass spectrometer. An important feature in that respect is that fragmenting occurs at an energy which is below the energy required for fragmenting peptides. Alternatively or in addition, the moiety fragments in the mass spectrometer with a higher conversation rate than peptides. The term "conversion rate" is defined further below. Generally speaking, the requirement of a higher conversion rate than peptides applies to all energies below full peptide fragmentation. In a preferred embodiment, peptide fragmentation occurs at normalized high energy collisional dissociation (HCD) collision energies (NCE) of above about 30, for example in the interval between about 23 and about 30. The moiety (b) in accordance with the present invention preferably fragments at normalized HCD collision energies (NCE) below about 23.

While fragmentation thresholds are defined by reference to HCD collision energies, uses of compounds of the invention are not limited to a particular dissociation method. E.g., collision-induced dissociation (CID), SID, ETD, ECD or UV may be used as well.

It is established in the art that the mass spectrometer can be operated in different modes. Modes can be distinguished by the energy acquired by the ions in the mass spectrometer. In relation to analytes which are peptides, polypeptides or proteins, a mass spectrometer can be operated in a fragmenting mode and a non-fragmenting mode. While in the non-fragmenting mode the analytes are essentially left intact, this does not apply to the fragmenting mode. Owing to the use of higher energies, analytes, especially peptides, polypeptides and proteins will fragment. A mass spectrometer may also be operated such that it rapidly switches between the two modes such that a given fraction or sample is analyzed concomitantly in a fragmenting and a non-fragmenting mode.

While the prior art provides isobaric labels which fragment at an energy where also peptides fragment, this does not apply to the present invention. The present invention provides a moiety (b) of the first aspect which fragments at lower energies and/or with a higher conversion rate. As a consequence, the compound in accordance with the first aspect offers a new option, namely to operate the mass spectrometer at an energy where only moiety (b) fragments, but peptides do not fragment, and/or to operate it such that the moiety (b) fragments with a higher conversion rate than peptides. In accordance with the latter functional requirement it is understood that peptide fragmentation at a given energy does not have to be completely absent. Instead, what matters is that moiety (b) fragments with a higher conversion rate at a given energy. Thresholds are defined further below. Obviously, at sufficiently high energies, both moiety (b) and peptides will fragment to comparable and high degrees.

In a preferred embodiment, the above mentioned fragmenting of peptides is fragmenting of the peptide backbone. The term "peptide backbone" has its art-established meaning. It refers to the covalent chain formed by the nitrogen atom of the alpha amino group, the alpha carbon atom and the carbon atom of the carbonyl group directly bound to the alpha carbon atom of each constituent amino acid of a given peptide.

The term "higher conversion rate" preferably refers to at least 2-fold more fragmented moiety (b) as compared to peptide, preferably at least 3-fold, at least 5-fold or at least 10-fold more fragmented moiety (b) as compared to peptide. Preferably, these fold-change values apply for optimal energies for compound fragmentation. Preferably, said optimal energies for compound fragmentation are at normalized collision energies (NCE) of 22 or below.

It is furthermore of note that moiety (b) fragments at a single defined site. Fragmentation will give rise to a first and second moiety. While the prior art fails to describe or suggest compounds with the low energy fragmentation and/or high conversion properties of the compound of the first aspect, we note that the mentioned first and second moiety have counterparts in reporter moiety and balance moiety of art-established isobaric labeling compounds.

While the first moiety is set free, the second moiety remains bound to the peptide. The molecule or ion consisting of a second moiety and peptide is also referred to as complementary moiety, complementary molecule or complementary ion.

The compounds according to the present invention are characterized by high conversion rates while permitting their fragmentation under conditions which leave the attached peptide essentially untouched. The term "conversion" is used herein as being equivalent to fragmentation. Conversions of the compounds according to the present invention is at least 5-fold higher or at least 10-fold higher than that of art-established tandem mass tags (TMT) as reviewed above. Preferably, these fold-change values apply for optimal energies for compound fragmentation. Preferably, said optimal energies for compound fragmentation are at normalized collision energies (NCE) of 22 or below. Corresponding data are shown in the enclosed examples.

There are further art-established mass tags which fragment at more than one site, such as, for example, DSSO or TMT which fragment at two sites. The moiety (b) of the present invention is distinguished therefrom in that it fragments efficiently at one site.

The compounds of the present invention, to the extent they are isotope labeled (for details see further below), can be used as isobaric mass tags. State-of-the-art mass tags, as discussed above, provide for quantification and identification of analytes, analytes preferably being peptides, polypeptides and proteins, at the same time. Owing to the fragmentation properties of the compound in accordance with the first aspect of the present invention, these two aspects of mass spectrometry can be disentangled. In particular, by choosing energies which provide for fragmenting the compounds of the present invention, but not the attached peptide analytes, quantification can be performed while no or low additional fragmenting of the analyte occurs. This is advantageous, for example under circumstances where the identity of the analyte is already known and/or fragments of the analyte would negatively interfere with quantification.

The compounds in accordance with the first aspect, while isotope labeled in a preferred embodiment, do not have to be isotope labeled. Also non-isotope labeled forms of the compounds in accordance with the first aspect confer distinct advantages. For example, it provides for a method of MS-based enrichment or isolation of peptides of interest. To give an example, peptides of interest may be those which contain a cysteine residue. Cysteines contain a reactive sulfhydryl group. Compounds in accordance with the first aspect may be equipped with a reactive moiety which reacts with said sulfhydryl group. An example of such reactive moiety which reacts with said sulfhydryl group is iodoacetamide. When cysteine-containing peptides which are covalently joined to such compounds of the invention are fragmented in the mass spectrometer at energies where only the compound in accordance with the first aspect fragments, complementary fragments are obtained, which complementary fragments contain the peptide, but do not contain the first moiety of the compound in accordance with the first aspect. In other words, owing to the fragmentation behavior of the compound in accordance with the first aspect, all peptides having a cysteine and bound thereto a compound in accordance with the first aspect, lose the same molecular weight. Such property is conferred by compounds in accordance with the first aspect in non-labeled form and can be exploited for isolation and enrichment purposes, wherein biochemical enrichment or isolation of the respective peptides of interest is rendered dispensable. An aspect of the present invention which is detailed further below relates to the above described type of application of non-labeled compounds in accordance with the first aspect.

It is understood that first moiety and second moiety which are formed upon fragmenting of moiety (b) in accordance with the first aspect are not identical. Said moiety (b) does not fragment symmetrically nor is it a symmetrical molecule. Furthermore, when considering the compound in accordance with the first aspect as a whole, it is at least preferred that only a single reactive moiety is present. Said single reactive moiety is covalently joined to that part of moiety (b) which is said second moiety. Only thereby it is ensured that, upon fragmenting of the compound in its peptide bound form, a complementary fragment is formed which complementary fragment comprises or preferably consists of the analyte (which is said peptide) and said second moiety.

Furthermore, it is understood that, at least in a preferred embodiment, said compound in accordance with the first aspect comprises a single moiety (b).

While it is defined in item (b)(ii) of the first aspect that fragmentation of the compound when coupled to a peptide yields two fragments, it is to be understood that the compound in accordance with the first aspect, also when not coupled to a peptide, will fragment at the single site within moiety (b). As regards the fragmenting behavior of moiety (a), i.e. the reactive moiety, in its non-peptide bound form, this will depend on the particular reactive moiety to be chosen for a certain application. This is of no particular relevance for the present invention, though. What matters is that moiety (b) fragments at the single site as noted above.

It is understood that "said energy according to (i)" as recited in item (ii) of the first aspect refers to an energy below the threshold for (significant) peptide fragmentation. Furthermore, it is understood that "higher conversion rate" refers to statistically significantly higher conversion rate. Preferably, statistically significantly higher conversion rates occur at normalized collision energies (NCE; see below) up to about 22.

In a preferred embodiment of the compound of the first aspect (a) the energy at which said compound, when coupled to a peptide via said reactive group, fragments with a median conversion rate of about 35%, about 55%, about 75% or about 90% at normalized HCD collision energies of about 17, about 19, about 21 or about 23, respectively; and/or (b) fragmentation at sites other than said single site is below 20%, preferably below 10%, at the energy in accordance with (a).

In a further preferred embodiment of the compound of the first aspect (a) the energy at which said compound, when coupled to a peptide via said reactive group, fragments with a median conversion rate of about 30%, about 45%, about 65%, about 75% or more than 85% at normalized HCD collision energies of about 12, about 14, about 16, about 18 or above 20, respectively.

As noted above, "conversion" and "fragmentation" are used equivalently herein. For example, a conversion rate of 30% means that 30% of the compound get fragmented whereas 70% remain intact. The percentage of compound fragmentation (also called compound conversion) is calculated by dividing the intensity of the peptide-coupled reporter ion (fragmented compound coupled to the non-fragmented peptide) by the summed intensities of the precursor ions (non-fragmented peptide) with intact and fragmented compound.

The abbreviation "HCD" is art-established and refers to high energy collisional dissociation. As a matter of fact, the energy required to fragment a compound depends on the mass and the charge of said compound. In order to have a uniform measure of collision energy (CE), the notion of a normalized collision energy has been introduced. The absolute collision energy can be calculated from the normalized collision energy (NCE) as follows:

$$CE = \frac{NCE}{100} * \left(0.2 - \frac{z}{100}\right) * \frac{m}{z}$$

wherein m is the mass of the compound under consideration, and z is its charge. The NCE is always the same value for each ion, while the absolute collision energy is variable and depends on charge and mass; see, e.g. Neta et al., Journal of the American Society for Mass Spectrometry 20, 469-476 (2009).

Preferably, the above defined normalized collision energies are determined on Q exactive mass spectrometers by Thermo Fisher. On other instruments, analogously normalized energies may be used.

It is apparent from the above that compounds of the invention are characterized in that they fragment at lower energies than the peptide backbone. One of skill in the art will understand that fragmentation is generally a process which is not characterized by an instantaneous onset when increasing energies. Rather, fragmentation of a molecule which fully fragments at a given NCE may also occur, to a certain degree, at energies which are lower than the given value. For example, significant fragmentation of the peptide backbone occurs at NCE values of 27 and above, but may occur, to a significantly lower degree, also at lower energies. What matters for the purpose of the present invention is that conditions exist where preferential fragmentation of the compound occurs while the backbone of peptides is essentially left intact. A typical NCE value where this applies is an NCE between 5 and 22, preferably between 10 and 22. These are energies where fragmentation of the compound occurs to a statistically significantly higher degree when compared to a fragmentation of the peptide backbone. Accepting the notion of a statistically significant difference between fragmentation rates of the compound on the one hand and the peptide backbone on the other hand, one may introduce the parameter ANCE which is defined as follows: NCE at which the peptide backbone fragments to at least 30% minus NCE at which the molecule in accordance with the present invention fragments to at least 30% (see definition of compound fragmentation above, page 8). This value is positive for molecules in accordance with the present invention. It is negative or zero for prior art isobaric tags such as TMT.

The percentage of peptide backbone fragmentation (also called peptide backbone conversion) is calculated by dividing the sum of all fragment ions (b and y ions with intact and fragmented compound) by the summed intensities of peptide fragment ions and peptide precursor ions (summed intensities of b and y and precursor ions with intact and fragmented compound).

In a further preferred embodiment, said compound is isotope labeled and preferably comprises one, two, three, four, five, six, seven, eight, nine or ten isotope labeled atoms, isotope labeled atoms preferably being $^{13}C$ and/or $^{15}N$.

Isotope labeled forms of the compound in accordance with the first aspect are useful as isobaric mass tags. In line with the established notion of isobaric mass tags as reviewed in the introductory part of this specification, isotope labeled mass tags are typically provided in two or more distinct labeled forms, wherein the overall mass is always the same. A plurality of distinctly isotope labeled compounds, said compounds having the same structure, constitutes a preferred kit of the invention.

While the overall mass is the same, the labeling scheme is chosen in a way which allows variation of the mass of the first moiety and of the second moiety. The maximum number of possible differently labeled compounds having the same overall mass under given labeling scheme defines the maximum degree of multiplexing affordable by the given labeling pattern. To give a simple example, the compound in accordance with the first aspect may be designed such that in the first moiety there is exactly one position which may be labeled, and in the second moiety there is also exactly one position which may be labeled. Labeling may be, for example, $^{13}C$ labeling. If there is exactly one $^{13}C$ label in moiety (b), this may be implemented in two ways, namely either by labeling the mentioned position in the first moiety or by labeling the mentioned position in the second moiety. This yields two isobaric mass tags which are identical in mass, but, upon fragmentation of moiety (b), will yield distinguishable signals.

A higher degree of multiplexing is possible in those instances where first and/or second moiety contain more than one position amenable to labeling.

In a further preferred embodiment, said compound is not isotope labeled.

In structural terms, it is preferred that said compound comprises a moiety of formula (I)

wherein X is $SCH_3$, SO or $SO_2$; Y is $CH_2$, NH or O, provided that $(Y)_n$ comprises 0 or 1 group selected from NH and O; n is 0, 1, 2, 3, 4, 5, 6, 7 or 8, preferably 0 or 1; and Z is CHA-Y or $CH_2$—CO, wherein A is an electron-withdrawing group, preferably $NO_2$ or halogen such as F, wherein preferably said moiety is —SO—$(CH_2)_2$—CO—.

Given that said compound comprises a moiety of formula (I), it is understood that in the (complete) compound, the free valences on X and Z are filled.

Within said formula (I) the bond between (X) and the adjacent $CH_2$ group is the single site as mentioned above at which fragmenting occurs. Importantly, said bond is not a peptide bond. Prior art isobaric tags frequently use a peptide bond as fragmenting site. For that reason, prior art isobaric tags do not provide for selective fragmentation of the tag while leaving the analyte intact. Deviant therefrom, the present invention provides compounds which are more amenable to fragmentation than peptide bonds. On the other hand, the bond in the compound of the invention which is to be fragmented shall not be too fragile either. To explain further, in case of very fragile bonds, a fragmentation would already occur during the process of ionization which is not desirable. As such, the compounds of the invention strike a balance between recognizing the advantages of using tags which fragment at lower energies than analytes, especially peptides, on the one hand and the avoidance of relevant fragmentation already in the ionization phase. Relevant fragmentation would be considered to occur if more than 5% of compounds of the invention would fragment during the ionization phase.

Those parts which are not depicted in Formula (I), fragment at higher energies than the X—$CH_2$ bond in formula (I).

Particularly preferred is that X is SO.
Particularly preferred is that Y is $CH_2$.
Particularly preferred is that n is 0.
Particularly preferred is that Z is $CH_2$—CO.

X does not define a symmetry center of a compound of the invention.

The atoms in formula (I), preferably C and N atoms, can be isotope labeled.

In a further preferred embodiment, said reactive group is selected from N-hydroxy succinimide (NHS); azides including aryl azides such as phenyl azide and nitrophenyl azide; pentafluorophenyl (PFP) esters; psoralen; diazirines; phosphines; acetamides such as iodoacetamide, bromoacetamide and chloroacetamide; iodoacetic acid; maleimide; thiosulfonates; vinylsulfones; pyridyldithiol; alkynes; imidoesters; aryl halides such as difluoro aryl; hydrazides; alkoxyamines; carbodiimides; isocyanates and glyoxal.

Particularly preferred is NHS.

Further reactive groups are at the skilled person's disposal and can be chosen based on the functional group within a given peptide of interest to be targeted; see, for example, Greg T. Hermanson, Bioconjugate Techniques (ISBN: 978-0-12-382239-0). Functional groups in a peptide which may be targeted comprise the amino groups at the N-terminus and in basic amino acids, the sulfhydryl group of cysteine, the hydroxyl group of serine, threonine and tyroxine and the side chain carboxylates of aspartate and glutamate.

Related to the first aspect, but in a separate distinct second aspect, the present invention provides a compound, preferably of any of the preceding claims, said compound having formula (II)

$B^1$-formula (I)-$B^2$—D (II)

wherein $B^1$ and $B^2$ are moieties amenable to multiplexed isotope labeling, preferably multiplexed isotope labeling, preferably at C atoms; D is a reactive moiety as defined in relation to the first aspect; or a salt or solvate thereof, or, to the extent applicable, a tautomer, enantiomer, diastereomer, racemat or mixture thereof.

It is apparent that reactive moiety D is only linked to $B^2$. At least in a preferred embodiment, $B^1$ does not comprise any reactive moiety.

The notion of multiplexed isotope labeling has been explained herein above. Accordingly, it is understood that either one of moieties $B^1$ and $B^2$ contains at least one atom which is amenable to differential isotope labeling. An example of differential isotope labeling is the presence of $^{13}C$ at a given position in one isotope labeled form and $^{12}C$ (or, in the alternative, the natural isotope distribution) in the other isotope labeled form.

$^{13}C$ is a preferred isotope labeled form of a carbon atom. Alternatively or in addition, nitrogen atoms, to the extent they are present in moieties $B^1$ and $B^2$ may be isotope labeled. A preferred isotope label for nitrogen is $^{15}N$.

In a preferred embodiment of the compound in accordance with the second aspect, $B^1$ is defined by formula (III a) or (III b)

$H_3C$—$(Y)_m$-E-$(Y)_p$ (III a)

or

K—$CH_2$—$(Y)_m$-E-$(Y)_p$ (III b)

wherein E is O—CO, S—CO, O—CS, S—CS, $(CH_2)_2$ or NH—CO; Y is as defined in relation to formula (I) or $CH(CH_3)$; m is 1, 2 or 3; and p is 1, 2 or 3; K is an enrichment moiety; wherein preferably $B^1$ is $CH_3$—$CH_2$—O—CO—$CH_2$, $CH_3$—$CH_2$—NH—CO—$CH_2$, $CH_3$—CH($CH_3$)—O—CO—$CH_2$, or $CH_3$—CH($CH_3$)—NH—CO—$CH_2$; and/or $B^2$ is defined by formula (IV a), (IV b) or (IV c)

NR'—$(CH_2)_q$-G (IV a)

CHR'—$(CH_2)_q$-G (IV b)

OR'—$(CH_2)_q$-G (IV c)

wherein $R^1$ is H, $C_1$ to $C_4$ alkyl, or cycloalkyl such as cyclopentyl and cyclohexyl; G is a functional group for connecting, to the extent required, $B^2$ to said reactive group D; q is 1, 2, 3, 4, 5, 6, 7 or 8, preferably 1; wherein preferably $B^2$ is NH—$CH_2$—CO.

Optionally, $B^1$ may comprise an enrichment moiety K. This is shown as formula (III b).

Particularly preferred is that E is O—CO.
Particularly preferred is that m is 1.
Particularly preferred is that p is 1.

As noted above, moiety $B^2$ is connected to a reactive group D, group D in turn being designed for coupling to a functional group in an amino acid of a peptide. Depending on the particular design of said reactive group D, it may be advantageous or necessary that there is a connecting group G which provides for connecting the reactive group D to moiety $B^2$. To give an example, for the reactive group D which is NHS, the functional group for connecting, i.e. group G, is CO. When the hydroxy group of NHS binds to said CO, an active ester is formed; see, e.g. formulae (V) below.

Particularly preferred is that $R^1$ is H.
Particularly preferred is that q is 1.
Particularly preferred is formula (IVa).

In a further preferred embodiment, said compound (a) is isotope labeled, wherein isotope labels are present in one, more or all of $B^1$, formula (I) and $B^2$; and/or (b) has formula (V a) or (V b):

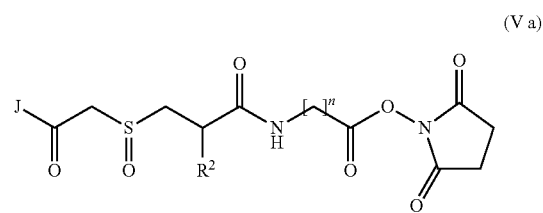

(V a)

wherein $R^2$ is hydrogen or an electron-withdrawing group such as halogen, $NH_3^+$, $NR^3R^4R^5$, or $NO_2$, wherein $R^3R^4$ and $R^5$ are independently C, to $C_6$ alkyl or cycloalkyl, $C_2$ to $C_6$ alkenyl or cycloalkenyl or $C_2$ to $C_6$ alkinyl;

J is a moiety amenable to isotope labeling and containing C and optionally N and/or O;

preferably substituted or unsubstituted $C_1$ to $C_6$ alkyl or cycloalkyl, substituted or unsubstituted $C_2$ to $C_6$ alkenyl or cycloalkenyl, or substituted or unsubstituted $C_2$ to $C_6$ alkinyl, wherein 1 or 2 carbon atoms may be replaced with heteroatoms selected from O, N, S and P, substituents including OH, halogen, methyl and methoxy; J most preferably being $H_3C$—$(CH_2)_r$—O, $H_3C$—$(CH_2)_r$—NH, $H_3C$—CH($CH_3$)—O or $H_3C$—CH($CH_3$)—NH;

n is an integer number between 0 and 19, preferably 1; and r is an integer number between 0 and 20, preferably 1;

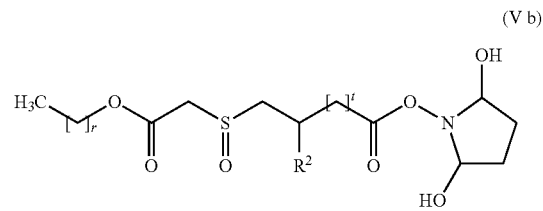

(V b)

wherein $R^2$ is an an electron-withdrawing group such as halogen, $NH_3^+$, $NR^3R^4R^{5+}$, or $NO_2$, wherein $R^3$, $R^4$ and $R^5$ are independently C, to $C_6$ alkyl or cycloalkyl, $C_2$ to $C_6$ alkenyl or cycloalkenyl or $C_2$ to $C_6$ alkinyl;

r and t independently are integer numbers between 1 and 20.

In a particularly preferred embodiment, formula (V a) is implemented by formula (V a1)

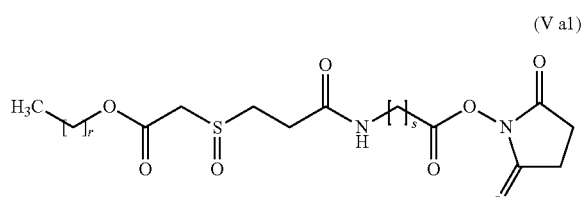
(V a1)

wherein r is an integer number between 0 and 20; and
wherein s is an integer number between 0 and 19.

In a particularly preferred embodiment, formula (V b) is implemented by formula (V b1)

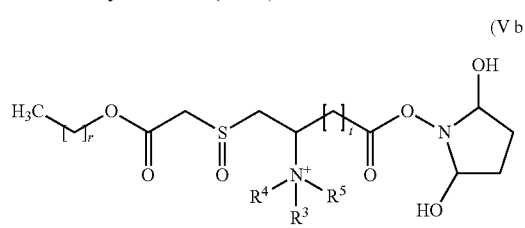
(V b1)

wherein r and t independently are integer numbers between 1 and 20 and $R^3$, $R^4$ and $R^5$ are as defined above.

Preferred in relation to formula (V a1) is that s=r−1. This allows for equal numbers of C atoms amenable to labeling on either side of the fragmentation site.

In a preferred embodiment, r=2 and s=1 (this applies to the compound of Formula (Va3)) or r=4 and s=3 (compound of Formula (Va2)). Molecules meeting this requirement are shown in formulae (V a2) and (V a3). Numbers indicate the C atoms amenable to labeling on either side of the fragmentation site.

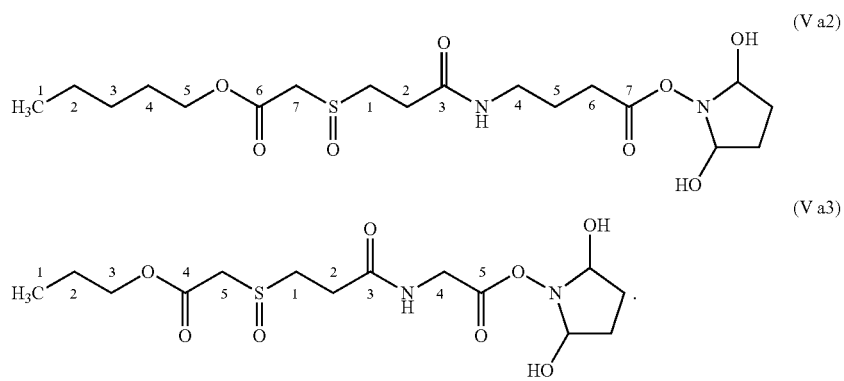

The compound of Formula (Va2) allows for multiplexed labeling, viz. 8-plexing, and the compound of Formula (Va3) allows 6-plexing.

Further preferred molecules implementing formula (V a) are:

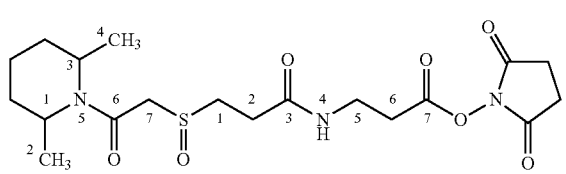
(V a4)

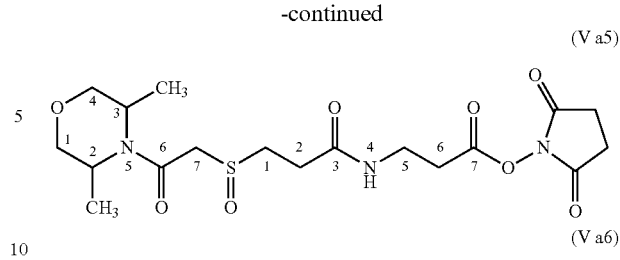

Similarly, r=1 with s=0 in formula (Va1) allows for 5-plexing, r=2 with s=1 for 6-plexing, and r=3 with s=2 for 7-plexing.

Preferred in relation to formula (V b) is that r=t. This allows for equal numbers of C atoms amenable to labeling on either side of the fragmentation site. In a preferred embodiment r=t=4.

As noted above, $R^3$, $R^4$ and $R^5$ are independently substituted or unsubstituted $C_1$ to $C_6$ alkyl or cycloalkyl, substituted or unsubstituted $C_2$ to $C_6$ alkenyl or cycloalkenyl, or substituted or unsubstituted $C_2$ to $C_6$ alkinyl. Preferred substituents are OH, halogen, methyl and methoxy. Preferred is $R^3=R^4=R^5$=methyl. Two of $R^3$, $R^4$ and $R^5$ may be together O or S. The third of $R^3$, $R^4$ and $R^5$ may be O or S. For example, $NR^3R^4R^5$ may be $NO_2$.

A preferred embodiment of formula (V b) is shown below.

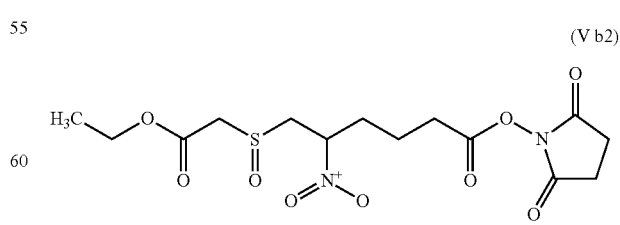
(V b2)

A further preferred compound of formula (V a) is the compound of formula (V a7):

(V a7)

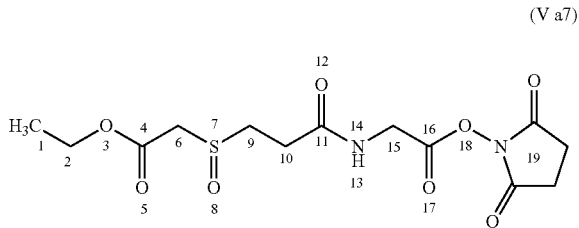

Further particularly preferred compounds of formula (V a) are:

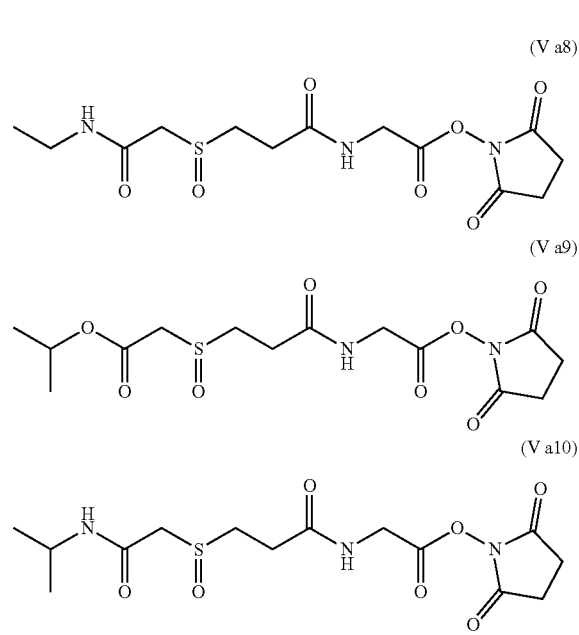

Coupling of the NHS-containing compound of formula (Va) to a peptide, said peptide bearing an amino group $NH_2$ is illustrated in the following scheme for the compound of formula (V a7):

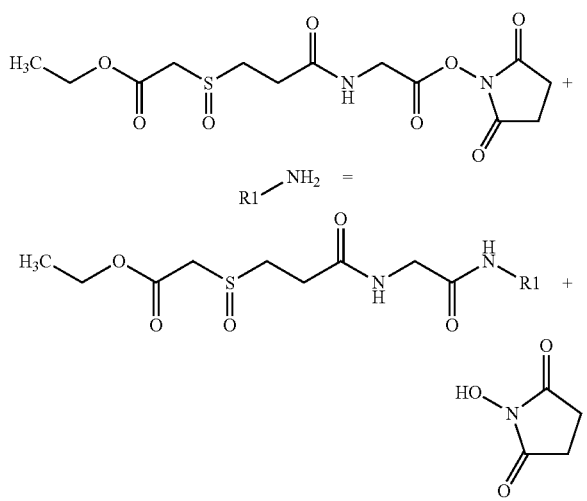

In a further preferred embodiment of the compounds in accordance with the invention, said first moiety is not charged. In other words, upon cleavage of the compound-peptide conjugates to yield first and second moieties, a neutral loss occurs and the charge which originally was present on said conjugate remains in its entirety on the second moiety which is the fragment which comprises the analyte. As a consequence, the m/z of the ions comprising the analytes remains unchanged upon fragmentation. This is advantageous, because the ions of the analyte will appear in a part of the spectrum (lower m/z range) which is generally characterized by high resolution and/or high accuracy. In particular, sensitivity is increased as compared to the prior art because a higher charge state is maintained upon fragmentation.

In a third aspect, the present invention provides a kit comprising or consisting of a plurality of compounds as defined in accordance with the first and/or the second aspect, wherein (a) said compounds are chemically identical and differently isotope labeled; or (b) said compounds are chemically different and not isotope labeled.

This aspect relates to two different types of kits. A kit in accordance with item (a) is designed for isobaric labeling, whereas a kit in accordance with item (b) is designed for loss-of-a-constant-mass applications which are further detailed below.

In relation to item (a), it is preferred that all possible differentially labeled forms are comprised in the kit.

Also in relation to item (a), it is preferred that said second moieties and/or the above disclosed constant parts of the second conjugates differ with regard to their exact mass and optionally with regard to their nominal mass. The term "nominal mass" refers to the sum of the mass numbers comprised in the compound. The term "exact mass" designates the actual, usually non-integer mass of the compound in unified atomic mass units (u). It is understood that if the second moieties of the compounds comprised in the kit in accordance with the present invention differ from each other in terms of the exact mass and optionally their nominal mass, also the first moieties will differ in their masses.

Generally speaking, preference will be given to kits where the constant parts of the second moieties differ with regard to their nominal mass. In certain instances, though, for example for the purpose of increasing the degree of multiplexing, it is desirable to include compounds in the kit of the invention where for certain pairs or subsets of said compounds, there is only a difference with regard to the exact mass, but not with regard to the nominal mass between the constant parts of the second moieties.

As regards item (b), said plurality of compounds may be chosen such that one compound comprises a reactive moiety designed for binding to amino groups, a second compound comprises a reactive moiety designed for binding to sulf-hydryl groups, etc.

In either case, said kit may comprise a manual with instructions. In case of item (a), said instructions may relate to methods of performing quantitative mass spectrometry which use isobaric mass tags. In case of item (b), the manual may provide instructions for performing methods based on loss of a constant mass. Preferred in that respect is that the manual describes methods of the invention as disclosed further below.

In a fourth aspect, the present invention provides a second compound selected from (a) a peptide carrying one or more compounds as defined in accordance with the first or second aspect; and (b) one or more complementary moieties obtained from the compound(s) of (a) by fragmenting the bond between X and $CH_2$ in formula (I) as defined above, wherein said complementary moiety/ies consist of or comprise said peptide and a second moiety.

Item (a) of this aspect relates to a peptide bound form of a compound in accordance with the first or second aspect. Item (b) relates to a fragmentation product of (a).

In a preferred embodiment, said peptide comprised in said second compound is obtained by proteolytic digestion of a protein and preferably is a tryptic peptide.

In a further preferred embodiment, said peptide and said second compound is ionized.

In a preferred embodiment of the second compound wherein said peptide is ionized, the charge of said peptide is at least 2.

In a fifth aspect, the present invention provides a library of second compounds, said second compounds being defined herein above.

In a preferred embodiment of said library, (a) said library comprises or consists of second compounds, said second compounds comprising a plurality of or preferably all of the peptides obtained from a protein or a plurality of proteins by proteolytic, preferably tryptic digestion; and/or (b) all possible chemically identical and differently isotope labeled compounds for a given compound of the first or second aspect or the corresponding second moieties, respectively, are comprised in said second compounds.

Noting that a second compound in accordance with the present invention may either be a peptide bound to a compound of the first or second aspect, or a complementary moiety obtained thereof, it is understood that also a library in accordance with the fifth aspect may comprise or consist of second compounds of either or of both types.

In a sixth aspect, the present invention provides a first moiety, said first moiety being obtained from the compound of formula (II) as defined above by fragmenting the bond between X and $CH_2$ in formula (I), wherein said first moiety comprises $B^1$. Said first moiety will be detectable by MS if it is charged. As noted above, though, said first moiety is preferably uncharged.

Related thereto, the present invention provides in a seventh aspect a plurality of differently isotope labeled first moieties as defined in accordance with the sixth aspect.

The sixth and seventh aspect can be seen as being complementary to second compounds in accordance with the fourth aspect, in particular item (b) thereof and libraries of second compounds in accordance with the fifth aspect, again to the extent said second compounds are second compounds in accordance with item (b) of the fourth aspect. In other words, when fragmenting occurs at the mentioned single site, first moieties and second compounds (in accordance with item (b) of the fourth aspect) are created.

In an eighth aspect, the present invention provides the use of a compound as defined in accordance with the first or second aspect or of a kit in accordance with item (a) of the third aspect for isobaric labeling.

The notion of isobaric labeling as such is art-established and has been discussed herein above. Isobaric labeling permits multiplexing. A more specific discussion of multiplexing in relation to preferred compounds of the invention is provided above.

In a ninth aspect, the present invention provides a method of sample preparation for mass spectrometry, said sample comprising proteins, polypeptides and/or peptides, and said method comprising: (a) optional proteolytic digestion of said sample, preferably with trypsin; and (b) reacting said proteins, polypeptides and/or peptides, or, in case step (a) is performed, the peptides obtained in step (a), with a compound as defined in accordance with the first or second aspect.

In a preferred aspect of said method, the method further comprises (c) repeating said method of the ninth aspect for at least one further sample with a compound as defined in accordance with the first or second aspect which compound is chemically identical with and differently isotope labeled when compared with the compound used in step (b). The term "differently isotope labeled" implies that upon fragmentation of the compound bound to peptides of the first sample on the one hand and the further sample on the other hand, second moieties are formed the constant parts of which in any case differ with regard to their exact mass and furthermore may—and preferably do so—differ with regard to their nominal masses.

In a tenth aspect, the present invention provides a method of quantitative mass spectrometry, said method comprising the method of the ninth aspect and (d) pooling the results of (b) and (c); (e) performing mass spectrometry of the result of (d), wherein peak intensities of first moieties and/or complementary moieties are indicative of the amounts of a given peptide contained in a given sample. Preferably, peak intensities of the complementary moieties are used for the purpose of determining the amounts of a given peptide contained in a given sample. This is advantageous, because not only peaks originating from different samples appear at different m/z values in the spectrum, but also different analytes, i.e. different peptides within a given sample. This is because the ions which are analyzed in the mass spectrometer comprise the analyte as part of it. This distinguishes the present invention from those prior art methods where only reporter intensities are monitored.

A further advantage of analyzing the complementary moieties is that interference by co-eluting analytes is significantly reduced. While prior art methods analyzing reporter ions generally suffer from ratio compression, this does not apply to the approach of the present invention. The term "ratio compression" designates a systematic underestimation of relative abundances of a given analyte when comparing two samples.

This aspect of the invention implements the isobaric labeling approach, wherein compounds of the present invention are used.

In a preferred embodiment, step (e) is performed such that fragmenting occurs only or substantially only at the single site defined in accordance with the first aspect, preferably by using a normalized HCD collision energy at or below the values as defined in accordance with the first aspect.

This embodiment benefits from the properties of the compound in accordance with the first and second aspect. In particular, analyte quantification and analyte identification are disentangled. By using lower energies in the mass spectrometer only the compound will fragment, but not the peptide analyte, and/or the compound fragments with a higher conversion rate than the peptide analyte. This enables MS2-based quantification of complementary peptide reporter ions containing the cleaved compound of the invention in MS2 scans.

Related to the tenth aspect, the present invention provides in an eleventh aspect the use of at least one compound as defined in accordance with the first or second aspect for quantitation of proteins, polypeptides and/or peptides by mass spectrometry.

In accordance with said use, preferably a peptide carrying one or more compounds of the first or second aspect is ionized and selected, preferentially with a data dependent acquisition method (such as TopX), subsequently fragmented at NCEs below about 23, below about 21, below about 19 or below about 17, and complementary reporter ions, comprising said cleaved peptide and the cleaved compound of the invention, are quantified in MS2 scans.

In a preferred embodiment of said use, more than one compound as defined in accordance with the first or second aspect is used, and wherein the compounds are chemically identical and differently isotope labeled.

In a further preferred embodiment, said use does not involve identification and/or fragmentation in the mass spectrometer of said proteins, said polypeptides and/or said peptides.

In a twelfth aspect, the present invention provides the use of a compound of the first or second aspect for isolating or enriching of peptides in mass spectrometry, said isolating or enriching preferably being based on neutral loss and/or constant loss.

As noted above, the fragmenting properties of compounds in accordance with the present invention may also be exploited in applications which do not require isotope labeling, in particular not a differential isotope labeling scheme. To the contrary, for one of such applications which is the use disclosed above, each of the analytes under consideration is bound to a compound of the invention, and when the corresponding conjugates are fragmented at low energies, complementary ions are formed, wherein it is required that the mass of said complementary ions in all instances differs by the same mass from the peptide-compound conjugate from which they are formed. This difference by the same mass is also referred to as "constant loss". This does not exclude, though, that a compound of the invention, when used in accordance with the twelfth aspect, is isotope labeled.

Related to the twelfth aspect, the present invention provides, in a thirteenth aspect, a method of isolating or enriching peptides in mass spectrometry, said method comprising: (a) reacting peptides with a compound as defined in accordance with the first or second aspect; (b) ionizing the result of (a); (c) separating ions obtained in (b) according to their m/z ratio; (d) fragmenting said ions at an energy that fragments compounds but not peptides, preferably by using a normalized HCD collision energy at or below the values as defined in accordance with the first or second aspect; (e) separating the ions obtained in (d) according to their m/z ratio; and (f) isolating those ions of (e) which exhibit a shift in m/z as compared to the MS1 scan, said shift corresponding to the first moiety as defined in accordance with the first or second aspect, thereby isolating said peptides.

Step (c) is commonly referred as "MS1 scan". No fragmentation occurs during this MS1 scan. Fragmenting in accordance with step (d) is analogous to the art-established all ion fragmentation (AIF) scan, however, and as defined in accordance with the twelfth aspect, the chosen normalized collision energies are lower, the consequence being that peptides are not or substantially not fragmented. The ions isolated in step (f) can be subjected to further downstream processing, such as fragmentation, said fragmentation generally referred to as "MS2 scan".

Said isolating in accordance with step (f) allows for dedicating more acquisition time to the specific ions of interest in any downstream processing of said ions in the mass spectrometer, e.g. in accordance with the following preferred embodiment. Dedicating more time means better sensitivity and/or greater speed of acquisition.

In a preferred embodiment, said method of the thirteenth aspect further comprises, after step (f), (g) fragmenting peptides; and (h) separating the result of (g) according to m/z ratio, thereby identifying said peptides.

This preferred embodiment is an MS2 scan. Advantageously, the thirteenth aspect of the present invention does not require an MS3 scan.

In a further preferred embodiment, said method further comprises prior to step (a), (a') proteolytic digestion of a sample comprising proteins, preferably with trypsin, thereby obtaining said peptides of (a).

In a further preferred embodiment of the method of the tenth or the thirteenth aspect, to the extent ions are isolated, such isolating is performed such that only $^{12}C$ ions are isolated.

Moreover, in a separate aspect, the present invention provides a method of operating a mass spectrometer, said method comprising a step of isolating ions, wherein said isolating is performed such that only $^{12}C$ ions are isolated.

The term "$^{12}C$ ion" designates an ion which contains only carbon atoms which are $^{12}C$ atoms.

It has to be understood that this, i.e., isolation such that only $^{12}C$ ions are isolated, is a deliberate choice which deviates from the standard settings of most mass spectrometers. To explain further, the mass spectrometer by default selects the most abundant ion from an isotope cluster. This may be the $^{12}C$, $^{13}C$ or $^{14}C$ isotope. The choice made by the instrument is not based on the type of isotope, but merely on its abundance. In accordance with the above disclosed preferred embodiment, abundance is abandoned as a parameter governing ion selection. Instead, it is enforced that only $^{12}C$ ions are isolated. This is a further means for significantly reducing or avoiding the above discussed ratio compression.

The term "isotopic cluster" has its art-established meaning. It refers to a group or cluster of peaks in a mass spectrum which belongs to molecules with a single given structure. The reason for the occurrence of a multitude of peaks is a consequence of the presence of different isotopes in each single molecule as a consequence of natural isotope distribution and/or deliberate isotope labeling.

In a preferred embodiment, said isolation is effected by centering the isolation window at the monoisotopic ion of interest.

It is preferred that said centering is effected by offsetting the center of said isolation window towards lower m/z ratios, preferably by between about 0.05 and about 0.5 Th, preferably by about 0.1 Th. "Th" refers to Thomson, which is the common unit on the m/z scale, i.e. 1 Thomson=1 amu/charge.

To explain further, the instrument default is to center the isolation window on the precursor ion to be selected. Since the isolation window has a defined size, co-selection of co-eluting ions may and in many instances will inevitably occur when the default symmetric tolerance below and above the selected precursor ion is used. Said defined size of said isolation window is generally in the range between 0.4 Th and 2.0 Th. A typical value is 1.4 Th. The minimal isolation window possible on machines as available on the filing date of this application is about 0.4 Th.

Deviant therefrom, the above disclosed preferred embodiment requires offsetting the center of the isolation window. In other words, the default symmetric isolation window is replaced by an asymmetric one. The term "asymmetric" means that the isolation window, preferably without changing its shape and width, is shifted towards lower m/z ratios, preferably by between about 0.05 and about 0.5 Th. This is a further means of avoiding co-isolation of $^{13}C$ labeled ions, in particular of peptides with charge states greater than 1. As a consequence, only $^{12}C$ fragment ions are generated by further cleavage of the moiety in MS2 spectra, enabling accurate and interference-less selection as well as MS2 based quantification of peptides carrying one or more compounds of the first and second aspect.

In case of charge state 2, for example, a very narrow isolation window can partially decrease co-isolation of the $^{13}C$ peak. However, decreasing the isolation window in size results in decreased isolation efficiency and hence the ions require longer injection times and hence more time. The advantage of the offset is, that one can still use larger windows with little ion losses but nevertheless avoid co-isolation of the $^{13}C$ peak.

It is to be understood that the above disclosed especially preferred embodiment combines two deviations from the default settings of the mass spectrometer: (i) not the most abundant ion, but deliberately $^{12}C$ ions are isolated, and (ii) an asymmetric isolation window is used. In other words, isolating of only $^{12}C$ ions is preferably effected by (i) selecting the $^{12}C$ ion within a given isotope cluster; and (ii) using an asymmetric isolation window.

In a further preferred embodiment, said isolation window has a width of between about 0.2 and about 0.4 Th.

Figure 7:
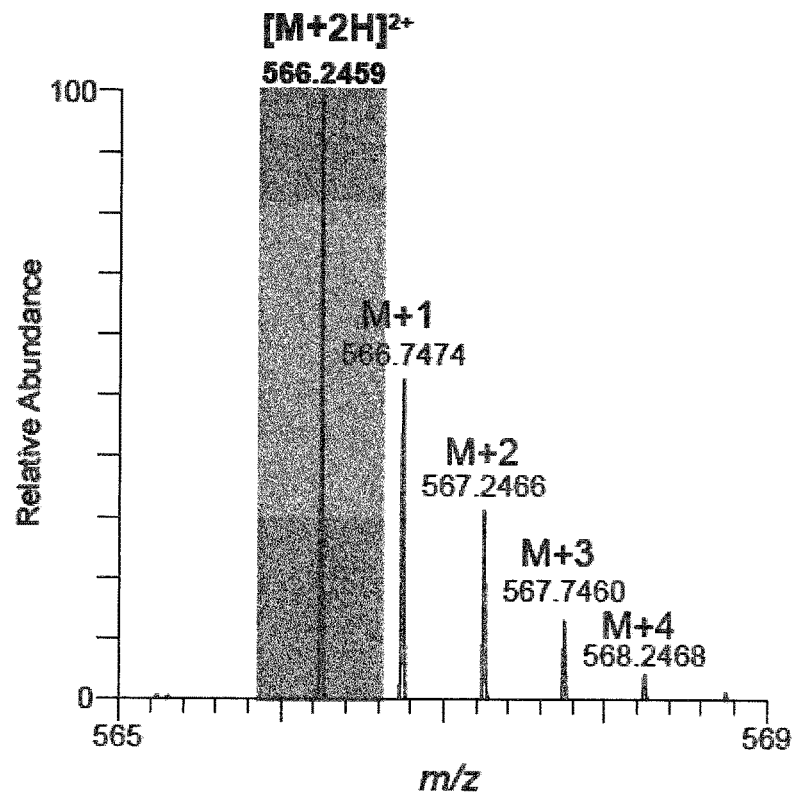
Figure 7:
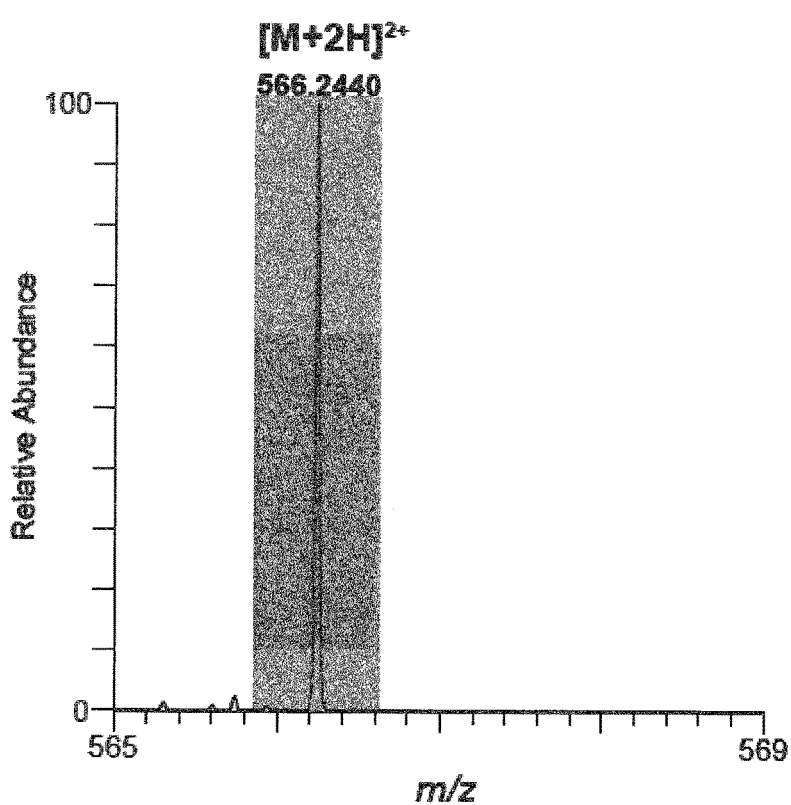
Figure 7:
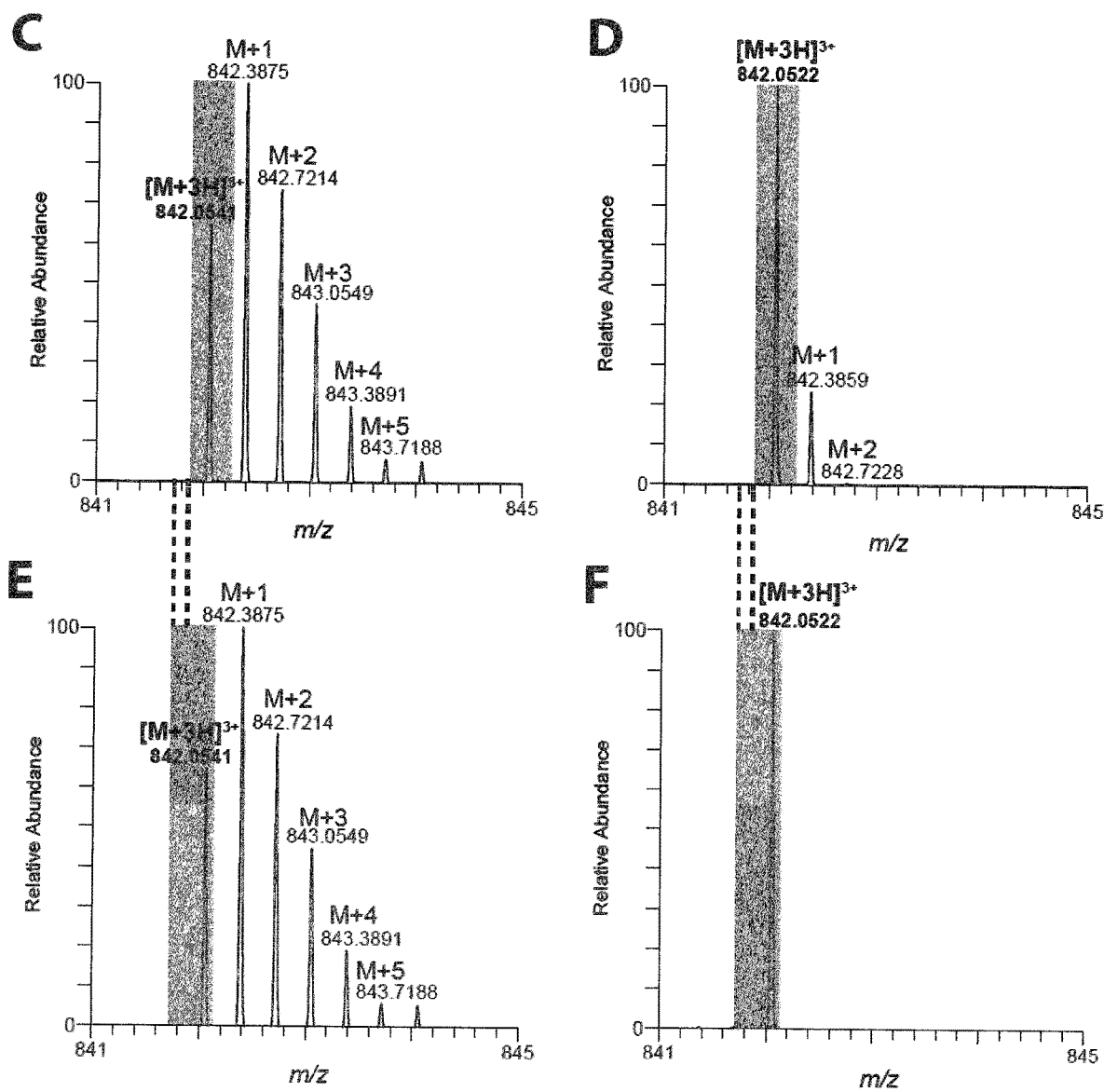

Example 7 and FIG. 7 exemplify the embodiments relating to the modification of mass spectrometer defaults as discussed above.

In a fourteenth aspect, the present invention relates to a method of performing mass spectrometry, said method comprising: (a) reacting peptides with a compound as defined in accordance with the invention to obtain compound-peptide conjugates; (b) ionizing the result of (a); and (c) performing one or both of (i) fragmenting the result of (b) at an energy where said conjugates preferentially fragment at the single site within said compound; and (ii) fragmenting the result of (b) at an energy that fragments both said compounds and said peptides; wherein, to the extent (i) and (ii) are both performed, they are performed concomitantly or subsequently in any order.

This method is directed to MS using compounds of the invention.

When use is made of step (d), this aspect is directed to the concomitant analysis of complementary ions wherein the peptide is intact, and ions comprising the constant part of the second moiety and a fragment of a peptide. This is expressed by the two fragmenting steps (c) and (d). In either case, use is made of the ions obtained in step (b). Accordingly, it is understood that in step (c) one aliquot of the result of (b) is used and in step (d) preferably another aliquot of the result of step (b) is used. In the definition of this aspect of the invention as given above, energies are defined in functional terms. The skilled person, provided with the compounds of the invention which favourably fragment at low energies and the teaching of the present disclosure can determine without further ado which energies are suitable for step (c) and which energies for step (d). Having said that, we note that a preferred NCE for step (c) is 22 or below. A preferred NCE for step (d) is 27 or above.

In a preferred embodiment of the above disclosed method and of the use of the eleventh aspect, to the extent in the course of said use fragmenting of the peptide analyte occurs, the MS spectrum obtained is subjected to post-processing comprising stacking. Said post-processing is preferably computer-implemented. The term "stacking" refers to a summation of intensities of all peaks originating from the same peptide fragment. To explain further, owing to the use of differentially labeled compounds of the invention (for the purpose of multiplexing), a plurality of ions is generated (which give rise to distinct peaks) which originate from the same peptide fragment but differ in their mass. The peak intensities of these ions are summed up. This allows for identification with higher confidence.

Preferably, said "stacking" also involves a change in the representation of the MS spectrum. In particular, for all ions originating from one specific peptide fragment, one peak per peptide fragment is presented, preferably at the m/z value of the peptide fragment with the unfragmented compound of the invention. The height of this peak is the sum of peak heights of all stacked peaks.

Preferably, said change in the representation of the spectrum is done after quantitation. The stacked peaks are used for—improved—identification. Generally speaking, quantification and identification are independent of each other and do not have to be performed in a defined order.

Examples of peptide fragments are b-ions and y-ions. The term "peptide fragment" may also include the unfragmented peptide.

For a given stacking, only peaks originating from one specific peptide fragment are used. The species giving rise to these peaks only differ with regard to the moiety originating from the compound of the invention, moieties being the unfragmented compound and constant parts of second moieties which differ with regard to isotope labeling.

In a preferred embodiment of this aspect, said method comprises an additional step of (d) determining the amount of a given peptide from the amounts of fragments obtained in (c)(i) and/or the amounts of fragments obtained in (c)(ii). Preferred for quantification is that both (c)(i) and (c)(ii) are performed.

The amount of a given peptide may be determined as median or mean, or weighted median or mean, of the peak intensities observed for the fragments obtained in (c)(i) and the fragments obtained in (c)(ii) and belonging to or originating from a given peptide species. To the extent weighted averages are used, higher weights are preferably given to higher peaks, given that those peaks are more accurate. Also, peaks with a signal-to-noise ratio of less than 3 are preferably disregarded. An additional or alternative means of improving processing of MS data obtained with compounds of the invention is the following. Each constant part, i.e. fragment of the compound of the invention attached to the peptide analyte defines a "channel". Each b-ion and each y-ion defines a cluster in the spectrum, and there are clusters in each channel. If a cluster has a different distribution of intensities from all others, the channel that exhibits said different distribution is deleted.

In terms of advantages, we have noted herein above that the compounds of the present invention allow for a significant reduction of interference by co-eluting peptides. The present preferred embodiment is yet an additional means to further reduce interference. The problem of ratio compression (which is well-known in the art and discussed herein above) is further mitigated by this preferred embodiment. In particular, averaging improves accuracy and precision. The coefficient of variation is typically reduced by at least 25%. Finally, while in the absence of these measures, MS3 might be necessary, MS2 is sufficient in many instances when performing averaging. MS3 would even not be more accurate. The benefit of the peptide-coupled reporter ions vs. MS3 is that the resolution of m/z determination by an orbitrap detector is always higher than any quadrupole-based isolation such as MS3.

In a fifteenth aspect, the present invention provides a method of operating a mass spectrometer comprising a detector, said detector preferably being an Orbitrap detector, said method comprising, in the time elapsing during the analysis of fragment ions in said detector, collecting and fragmenting of one or more further precursor ions.

Under certain circumstances, the time for analyzing in the detector of fragment ions obtained by fragmentation from precursor ions exceeds the time required for collecting and fragmenting subsequent precursor ions. As a consequence, when using state-of-the-art configuration of the spectrometer, the devices comprised in said spectrometer which are for isolation and fragmentation of precursors are idle while the detector is busy. For Q Exactive instruments with an orbitrap analyser, $10^5$ to $5 \times 10^5$ ions are usually collected to obtain an MS2 scan that contains sufficient ions for the identification of the peptide. In Q Exactive instruments, precursor ions are collected and fragmented while the orbitrap analyses the m/z of the previous fragmentation scan. While the time to analyse the m/z of the fragment ions in the orbitrap depends on the desired resolution, the time required for collecting and fragmenting enough precursor ions, depends on the abundance of the precursor ion. Therefore, typically enough precursor ions can be collected for high abundant precursors while the orbitrap is still busy with analyzing the previous scan.

The higher the resolution of the MS2 scan, the higher the mass accuracy and the better the identification and quantification (since peaks with little mass difference can be resolved and then discriminated from each other). The higher the number of precursors analysed together in one MS2 scan, the higher the number of identified peptides sequences in complex peptide mixtures.

The above aspect advantageously makes use of the mentioned idle time (sufficient ions collected and fragmented but detector still busy). Using state-of-the-art configuration, this idle time is not used to isolate and fragment further ions. In the present invention, the idle time is used to isolate and fragment a second, and, if time permits, third, fourth etc. precursor ion. Thereby, multiple precursor ions may be read out in the same MS2 (fragmentation) scan. By collecting a plurality of precursors, MS2 scans can be performed at higher resolutions.

Alternatively, by collecting a plurality of precursors, more precursors can be analysed at the same resolution without extending the analysis time.

To give an example of performing MS2 scans with more precursors at the same resolution: In a standard method on a Q Exactive HF Orbitrap instrument $10^5$ precursor ions are collected within 55 ms, then fragmented and analysed with a resolution of 30,000 at m/z 200, resulting in a transition time of 64 ms. Using the method of the invention, e.g. 2 different precursor ions ($10^5$ ions each) are collected within 55 ms (e.g. 25 ms is enough to collect $10^5$ ions of each precursor) and subsequently fragmented and analysed with a resolution of 30,000 at m/z 200, resulting in a transition time of 64 ms.

To give an example of performing MS2 scans at higher resolution:

In a standard method on a Q Exactive HF Orbitrap instrument $10^5$ precursor ions are collected within 55 ms, then fragmented and analysed with a resolution of 30,000 at m/z 200, resulting in a transition time of 64 ms. Using the method of the invention, e.g. 2 different precursor ions ($10^5$ ions each) are collected within 110 ms (55 ms is enough to collect $10^5$ ions of each precursor) and subsequently fragmented and analysed with a resolution of 60,000 at m/z 200, resulting in a transition time of 128 ms. In that case, the two precursors are analysed with a higher resolution within the same time frame.

Said method of operating a mass spectrometer is a preferred embodiment of any of the other methods and uses of this invention, including those methods and uses which employ compounds in accordance with the first and second aspect, and furthermore including the above disclosed method comprising isolating $^{12}C$ ions.

As regards the embodiments characterized in this specification, in particular in the claims, it is intended that each embodiment mentioned in a dependent claim is combined with each embodiment of each claim (independent or dependent) said dependent claim depends from.

For example, in case of an independent claim 1 reciting 3 alternatives A, B and C, a dependent claim 2 reciting 3 alternatives D, E and F and a claim 3 depending from claims 1 and 2 and reciting 3 alternatives G, H and I, it is to be understood that the specification unambiguously discloses embodiments corresponding to combinations A, D, G; A, D, H; A, D, I; A, E, G; A, E, H; A, E, I; A, F, G; A, F, H; A, F, I; B, D, G; B, D, H; B, D, I; B, E, G; B, E, H; B, E, I; B, F, G; B, F, H; B, F, I; C, D, G; C, D, H; C, D, I; C, E, G; C, E, H; C, E, I; C, F, G; C, F, H; C, F, I, unless specifically mentioned otherwise.

Similarly, and also in those cases where independent and/or dependent claims do not recite alternatives, it is understood that if dependent claims refer back to a plurality of preceding claims, any combination of subject-matter covered thereby is considered to be explicitly disclosed. For example, in case of an independent claim 1, a dependent claim 2 referring back to claim 1, and a dependent claim 3 referring back to both claims 2 and 1, it follows that the combination of the subject-matter of claims 3 and 1 is clearly and unambiguously disclosed as is the combination of the subject-matter of claims 3, 2 and 1. In case a further dependent claim 4 is present which refers to any one of claims 1 to 3, it follows that the combination of the subject-matter of claims 4 and 1, of claims 4, 2 and 1, of claims 4, 3 and 1, as well as of claims 4, 3, 2 and 1 is clearly and unambiguously disclosed.

The figures show:

FIG. 1: Chemical structures and fragmentation behavior of the symmetric sulfoxide linker SL1.

Figure 2:
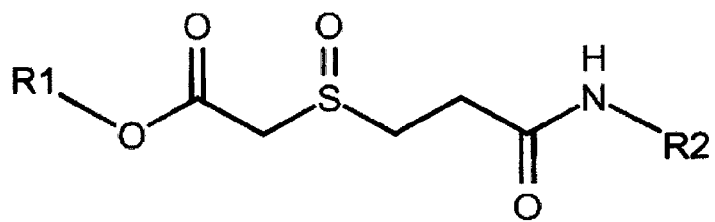
Figure 2:
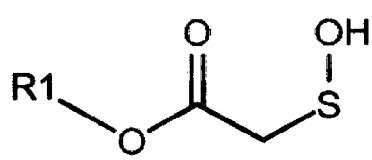
Figure 2:
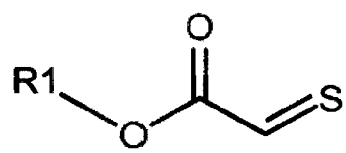
Figure 2:
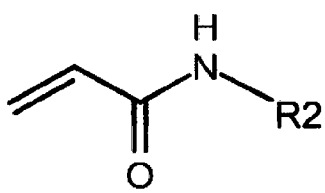
Figure 2:
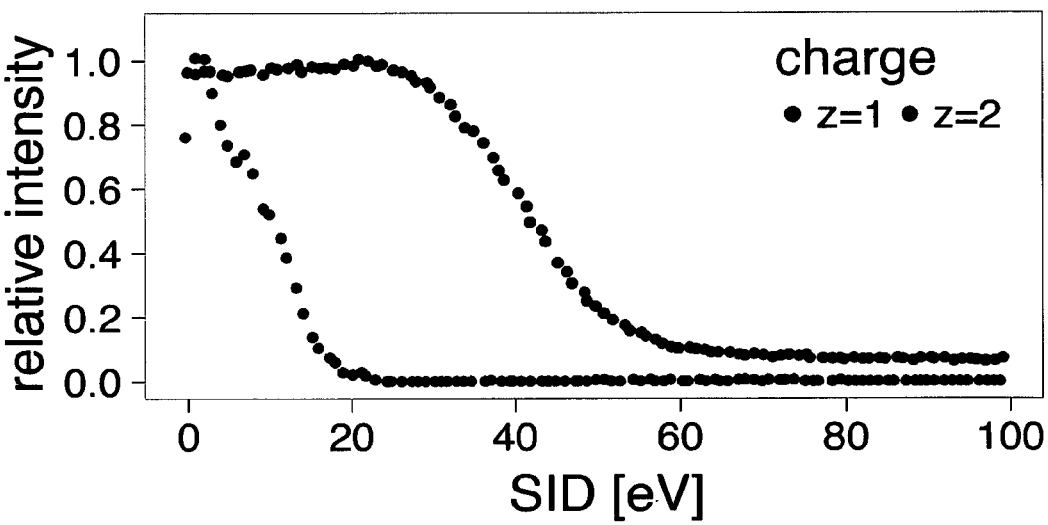
Figure 2:
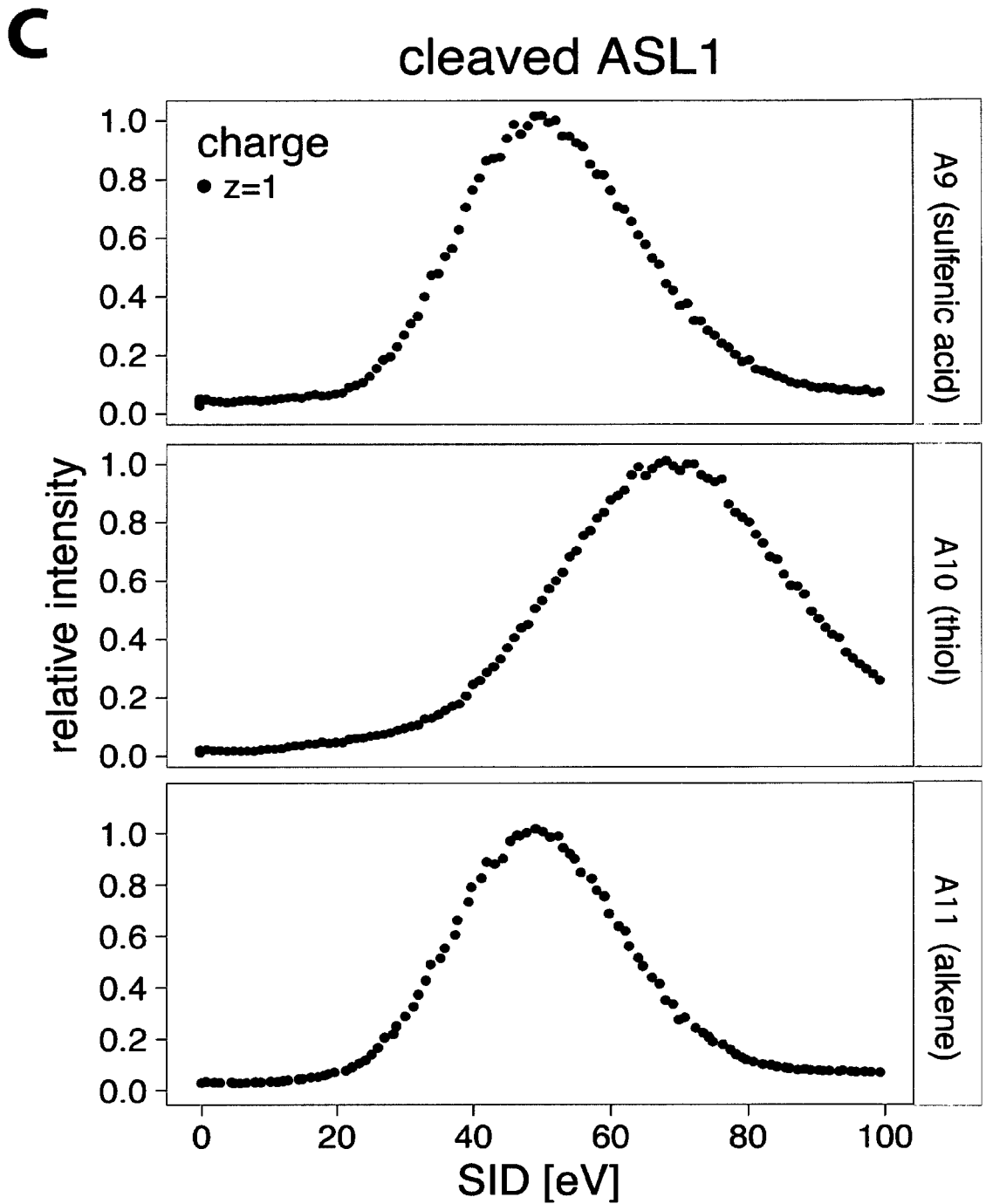
Figure 2:
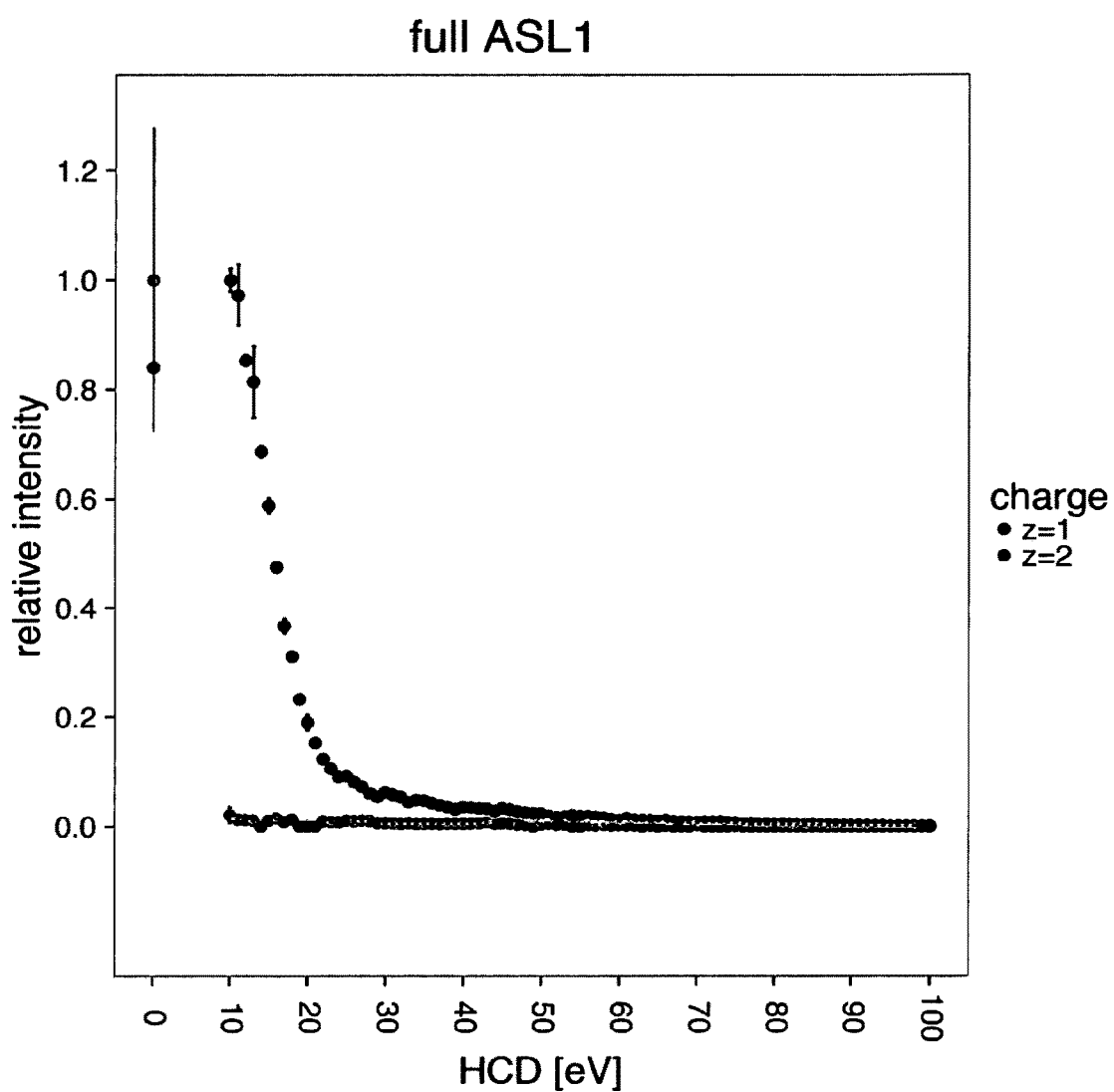
Figure 2:
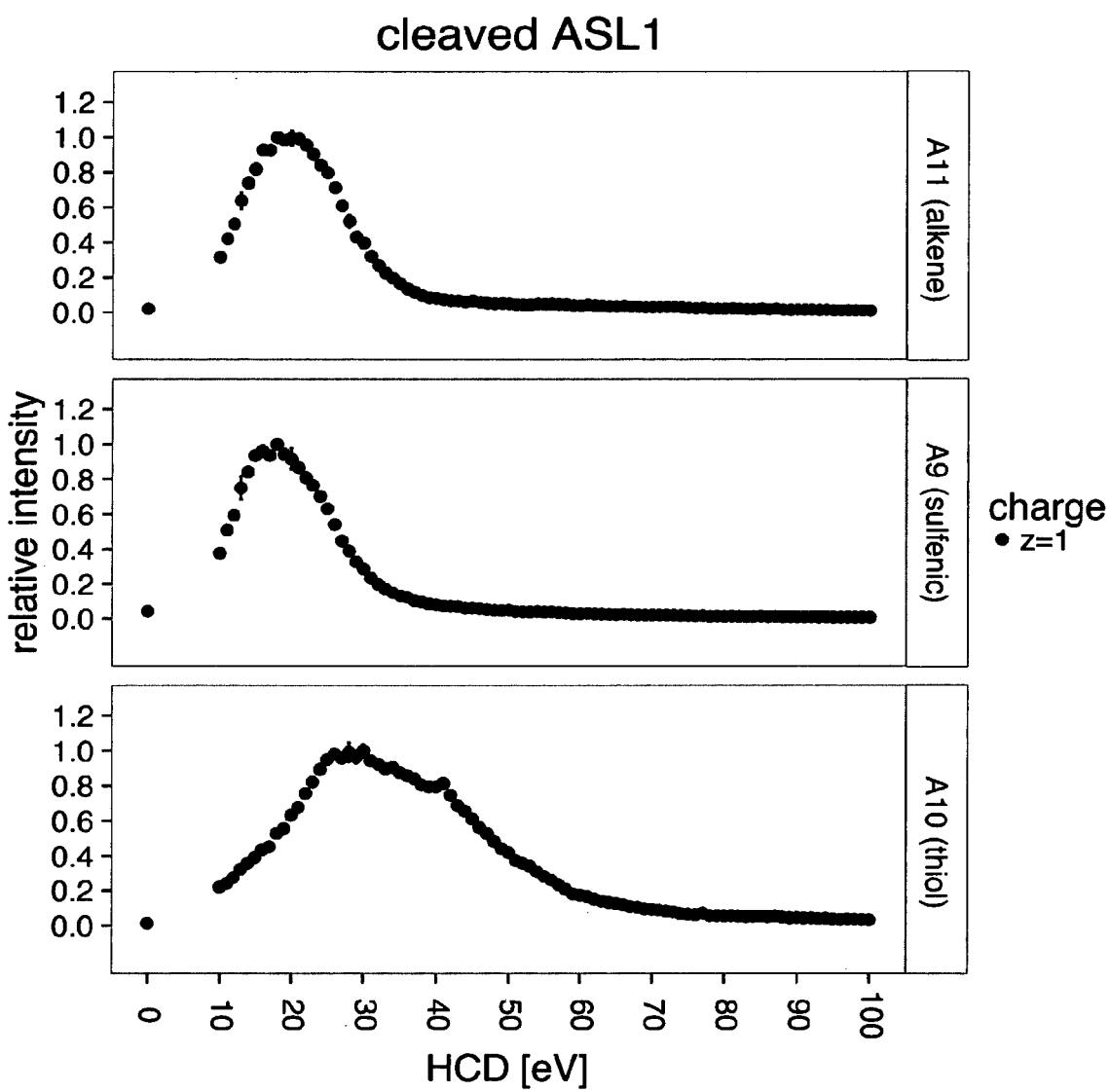

FIG. 2: Chemical structures and fragmentation behavior of the asymmetric sulfoxide linker ASL1.

Figure 3:
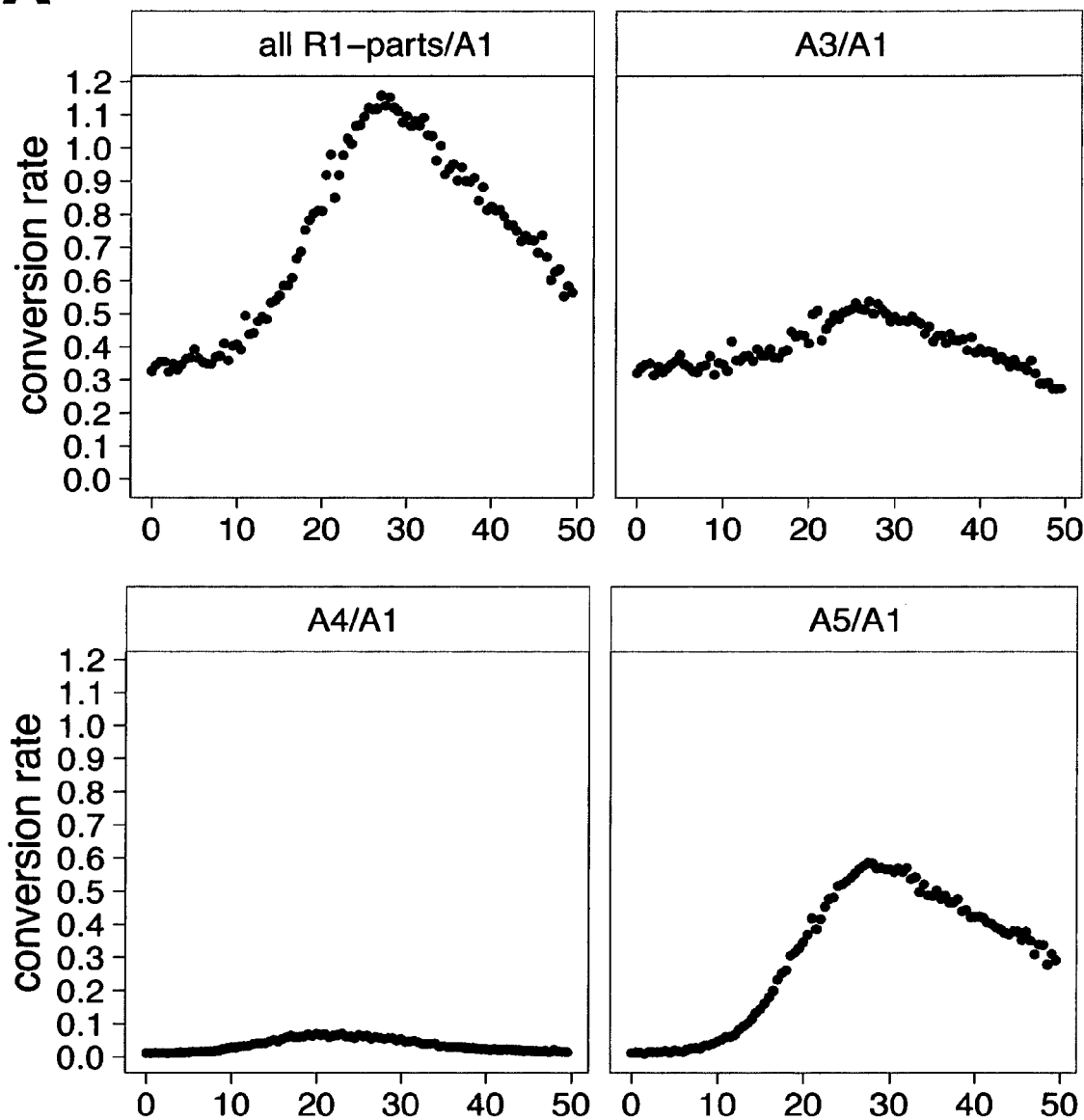
Figure 3:
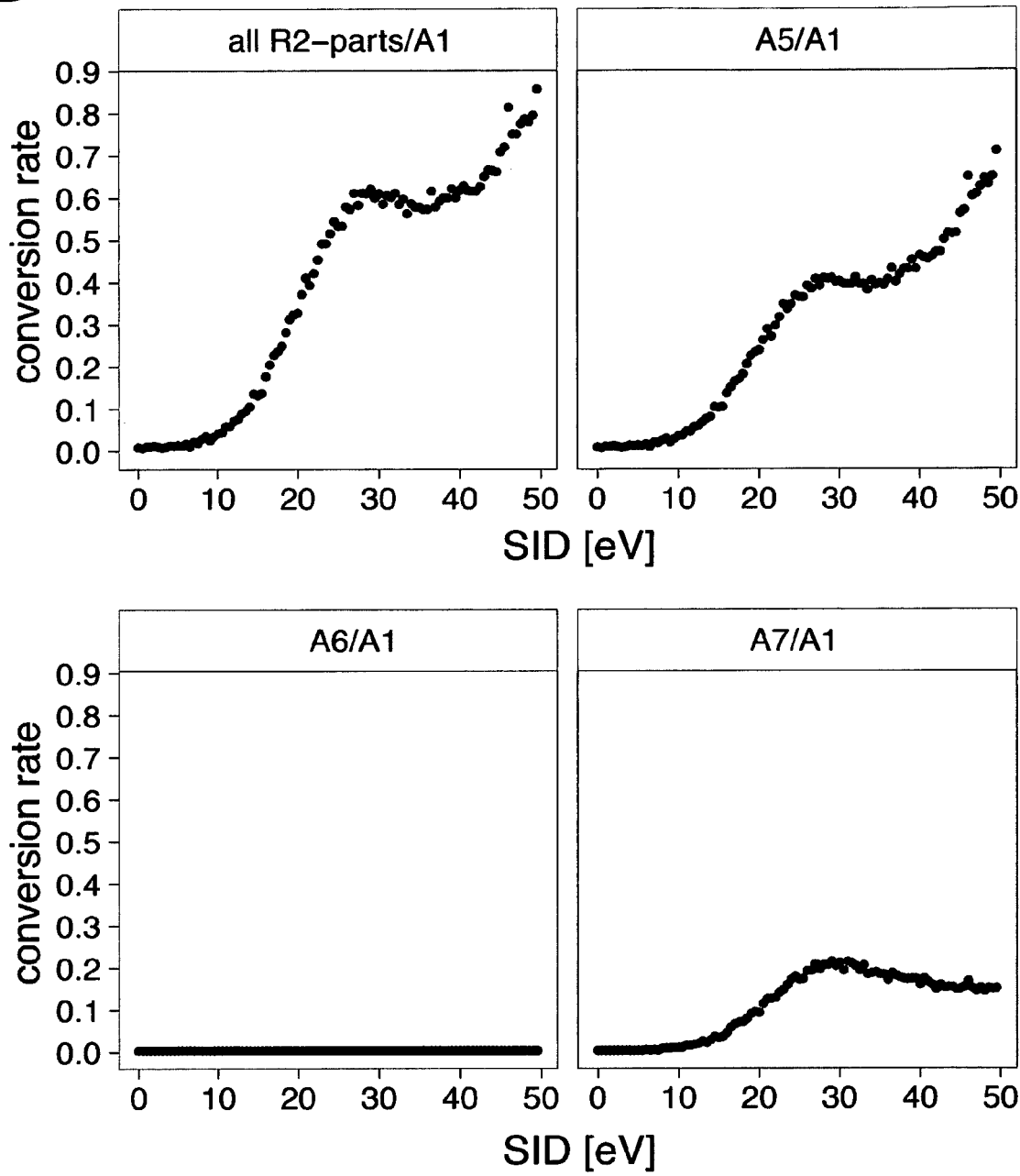
Figure 3:
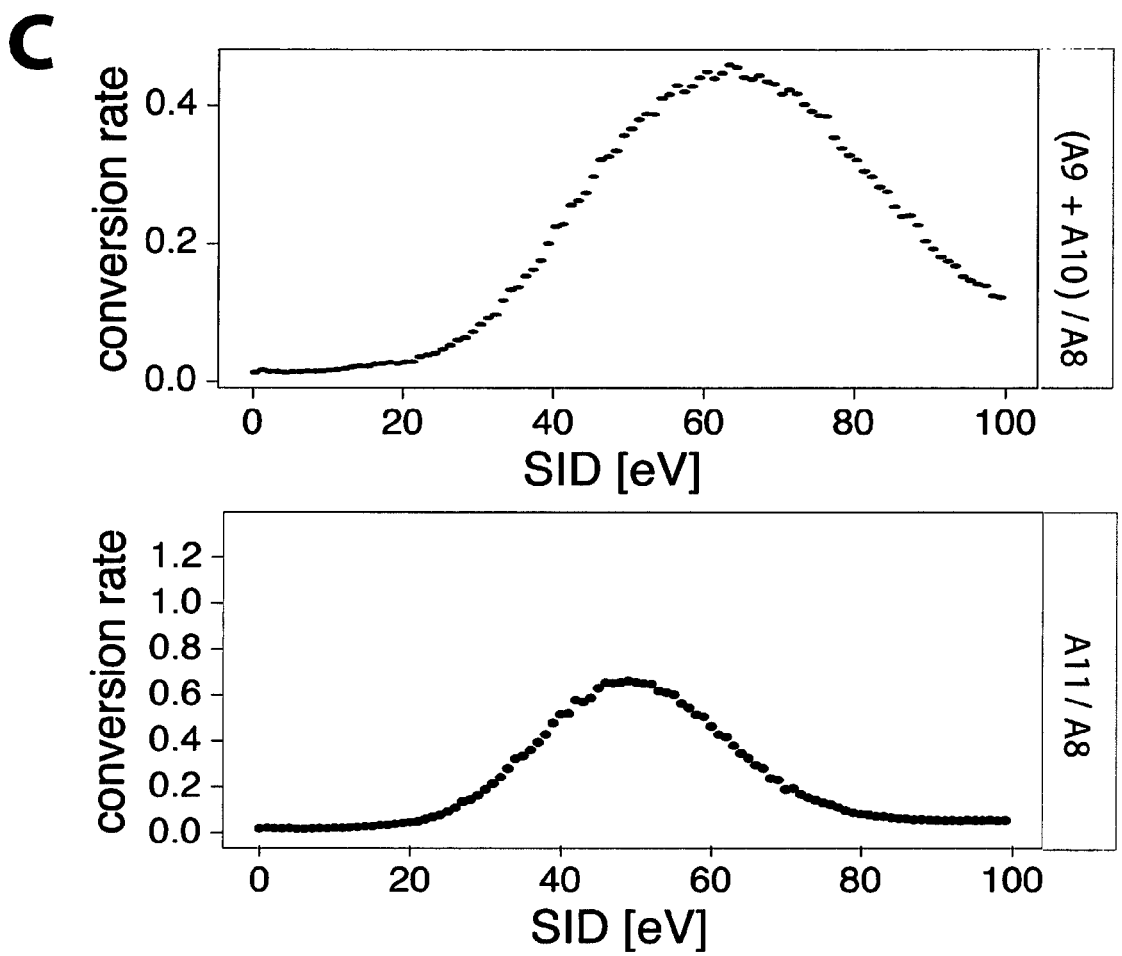
Figure 3:
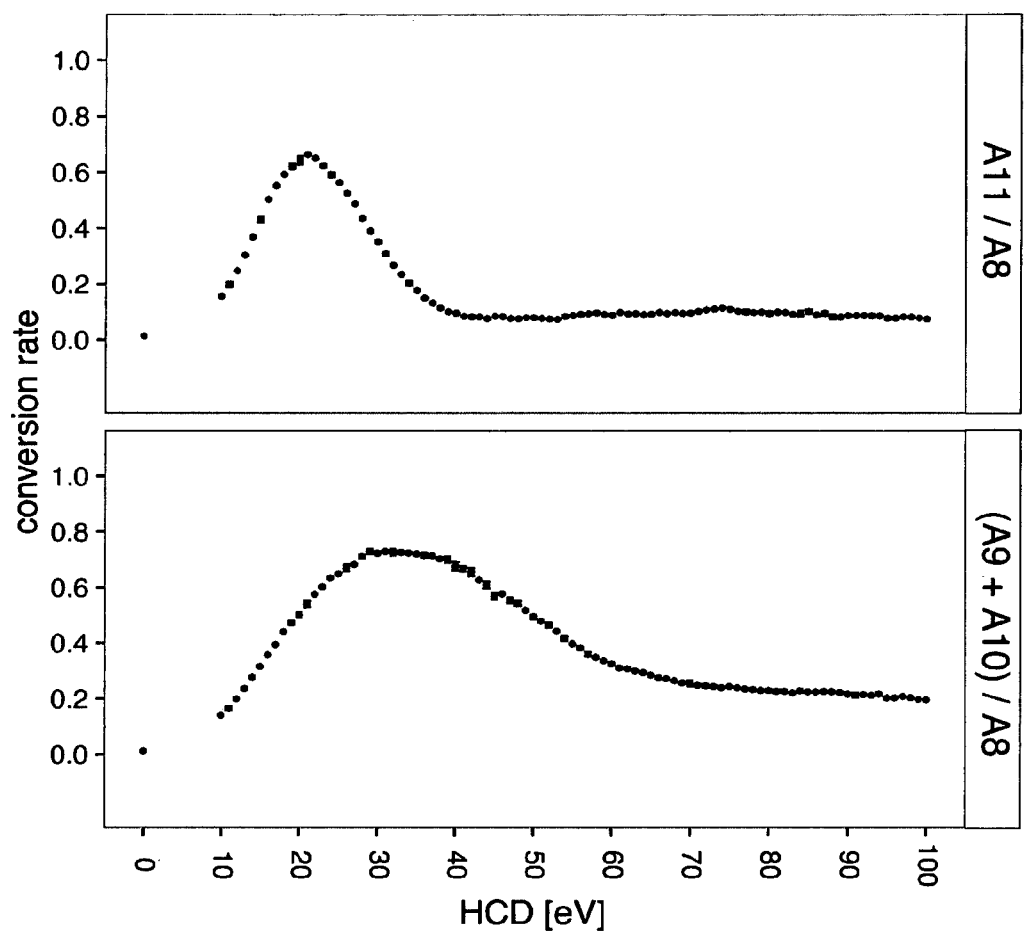

FIG. 3: Activation induced conversion rates. "Conversion" refers to conversion from unfragmented moiety to fragmented moiety. A conversion rate of, e.g., 0.4 means 60% of the compound is unfragmented and 40% is fragmented.

Figure 4:
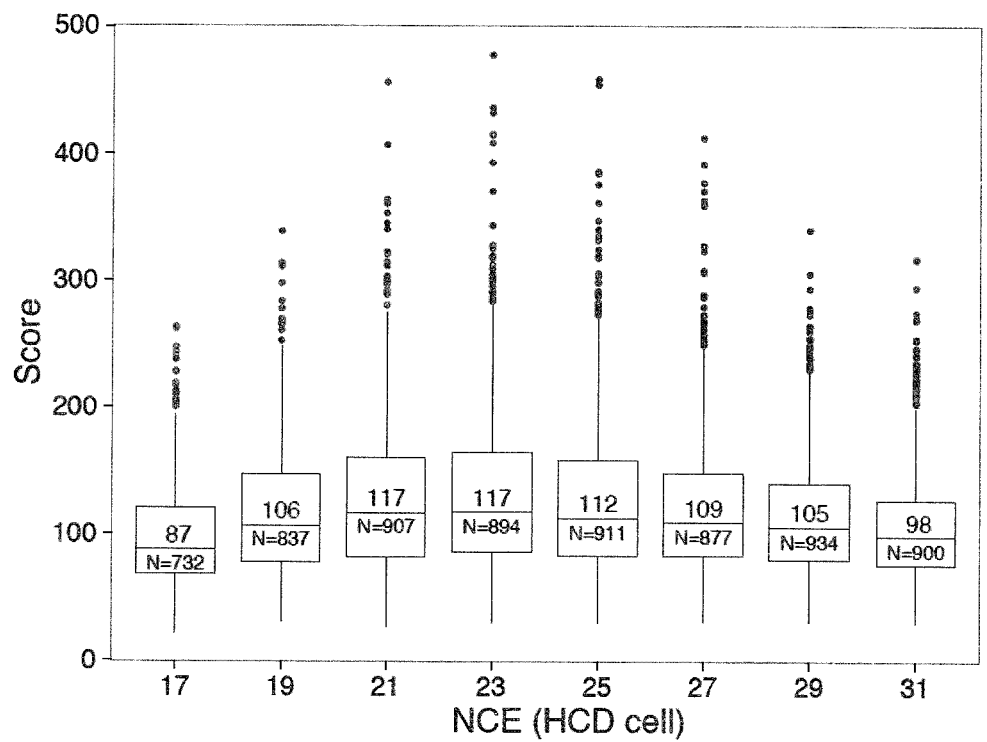
Figure 4:
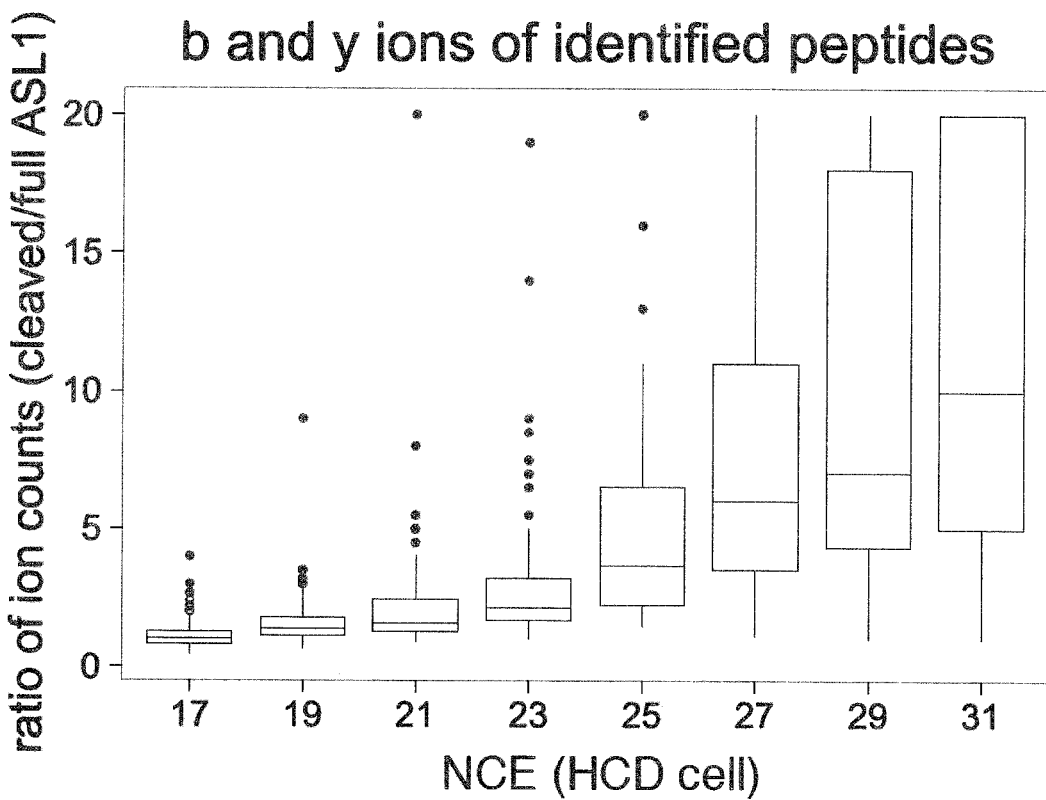
Figure 4:
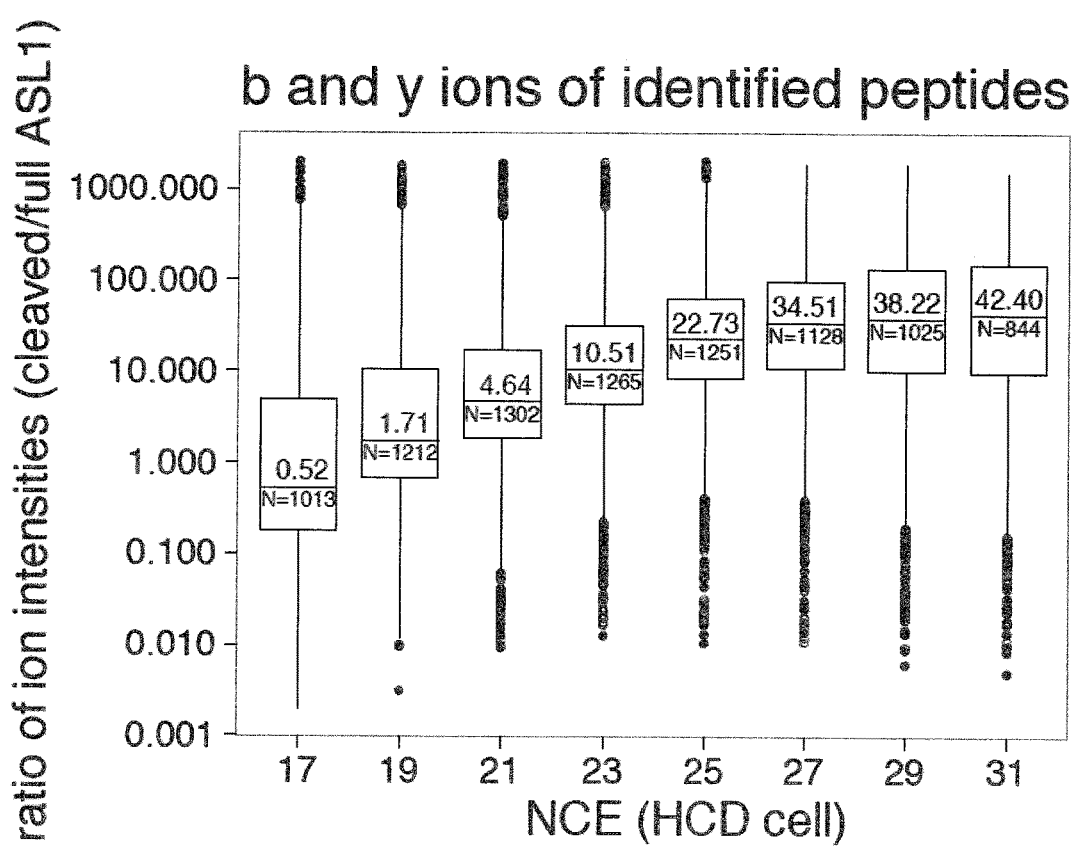

FIG. 4: Distinct collision energies allow quantification and identification of ASL1 coupled peptides.

Figure 5:
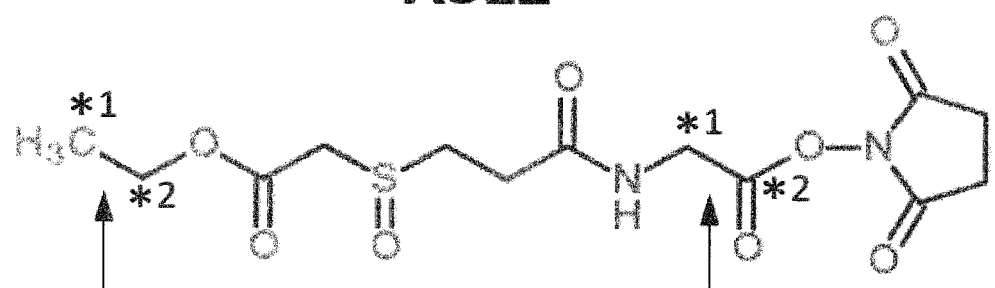
Figure 5:
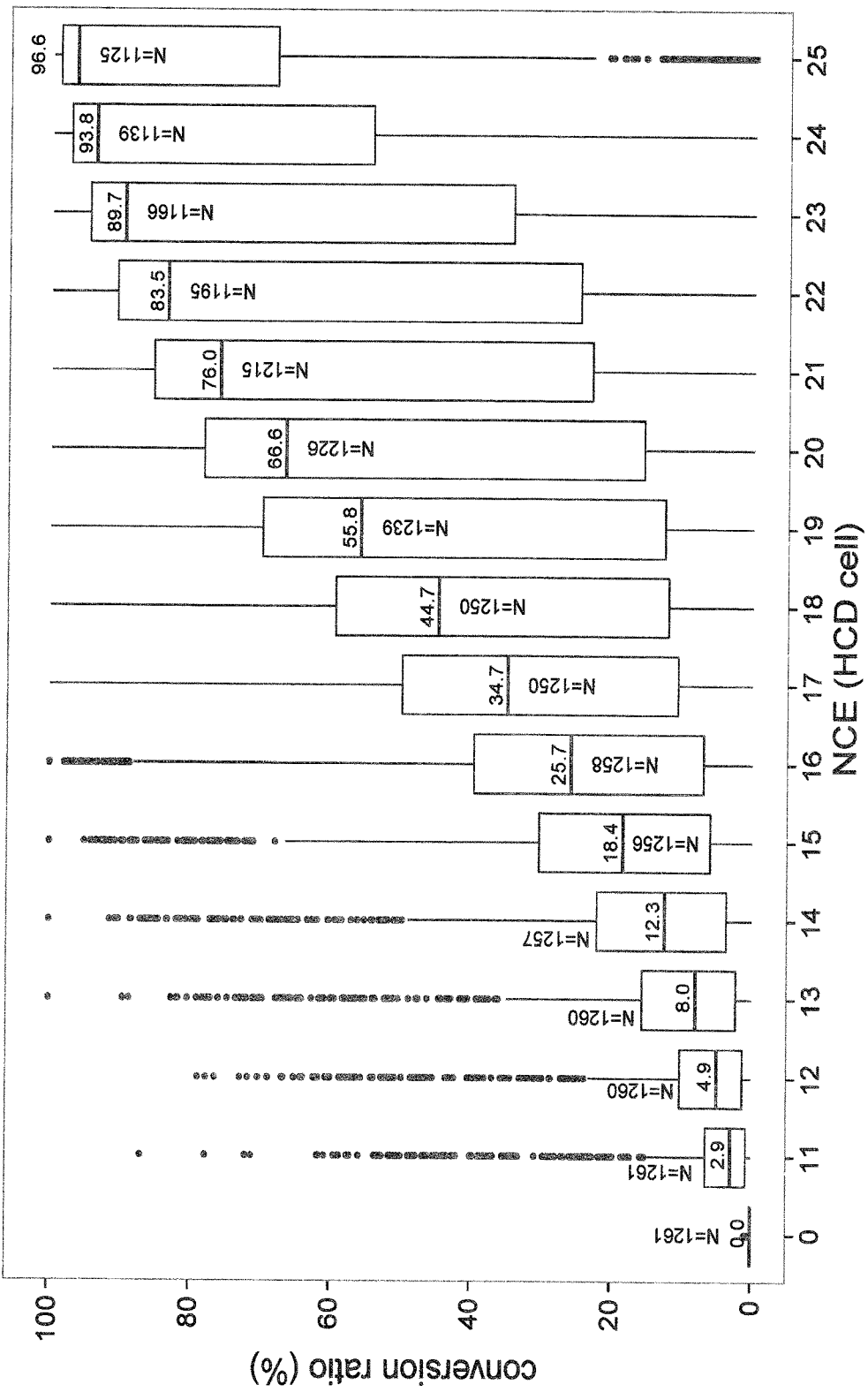
Figure 5:
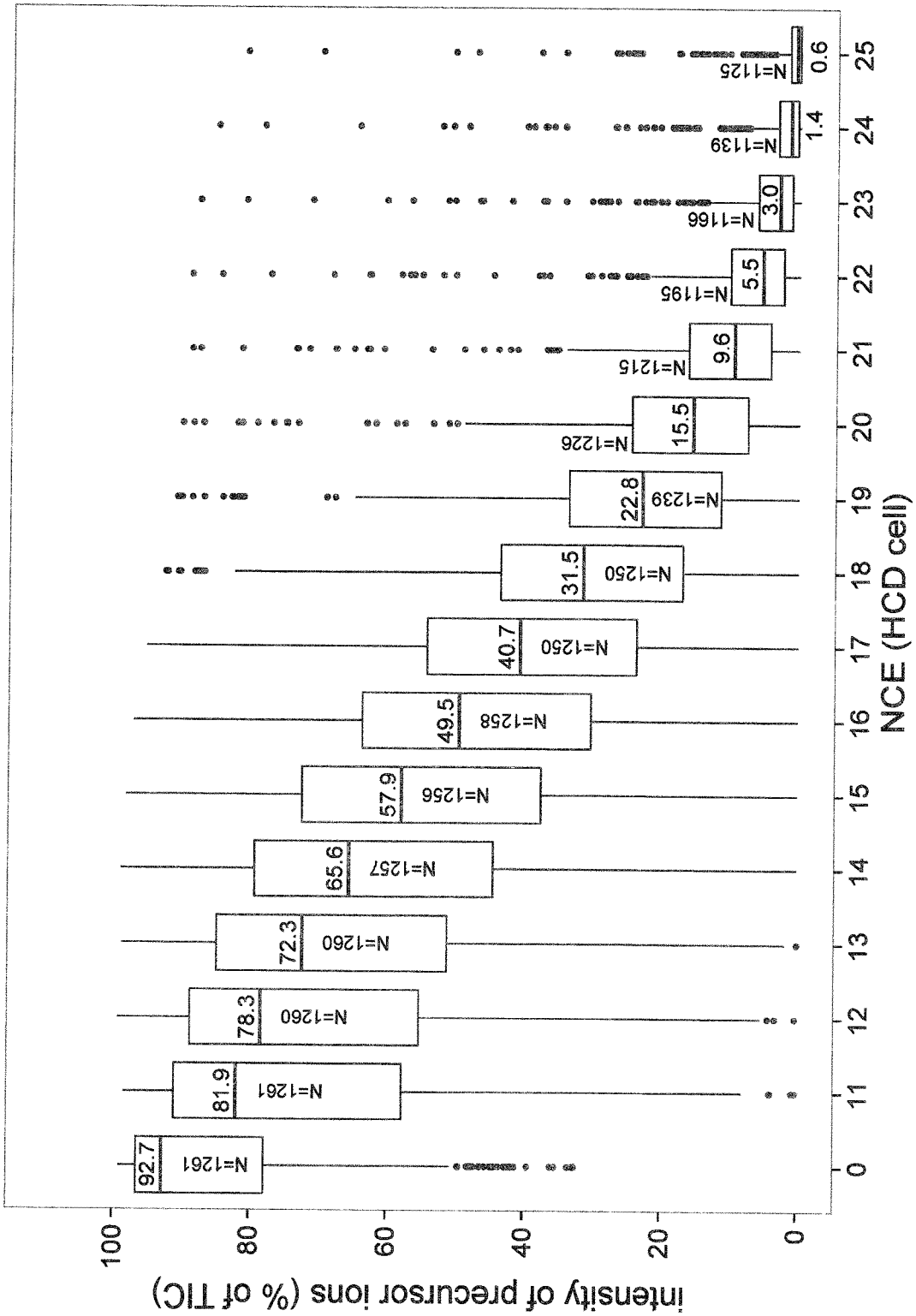
Figure 5:
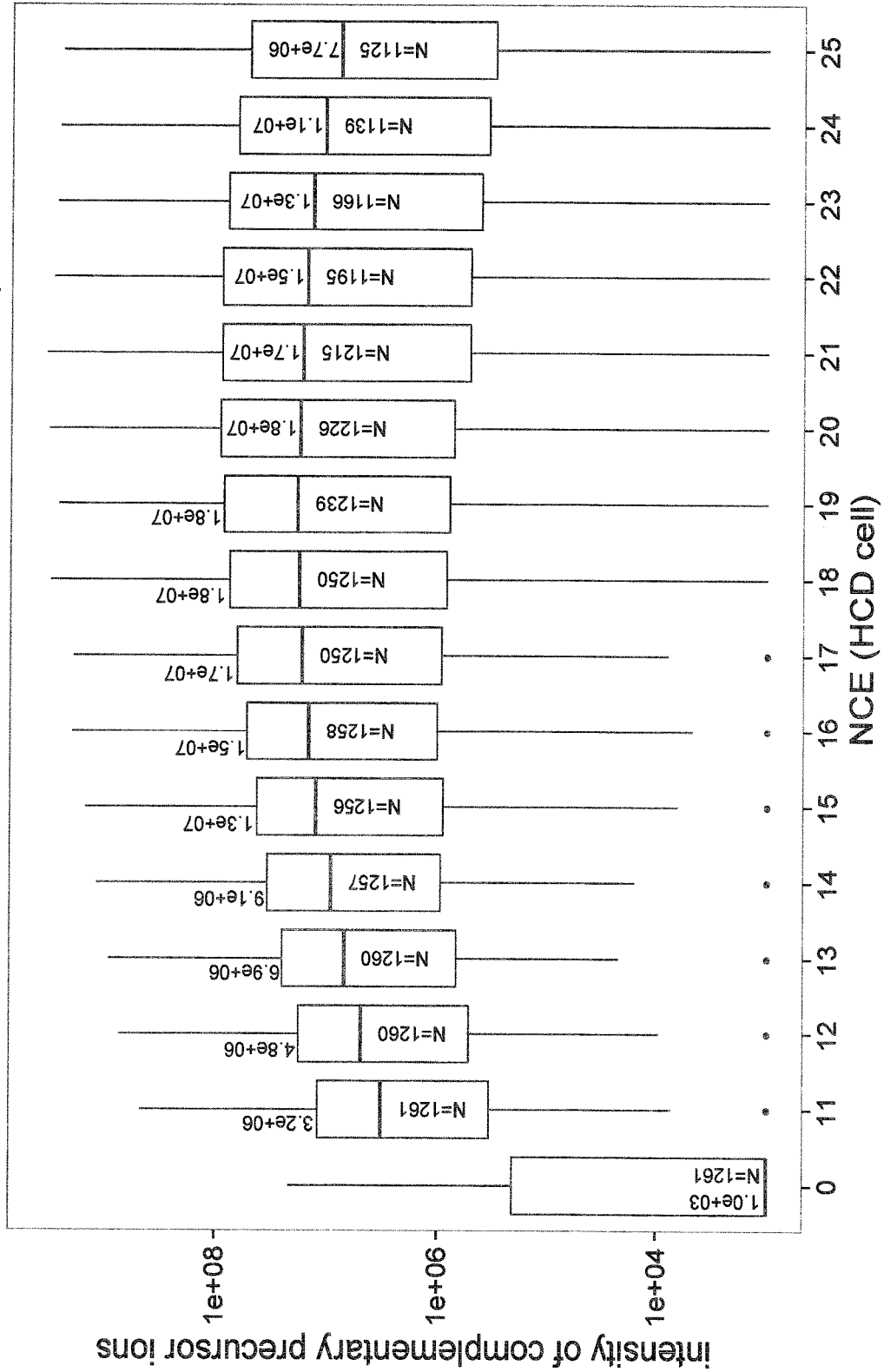
Figure 5:
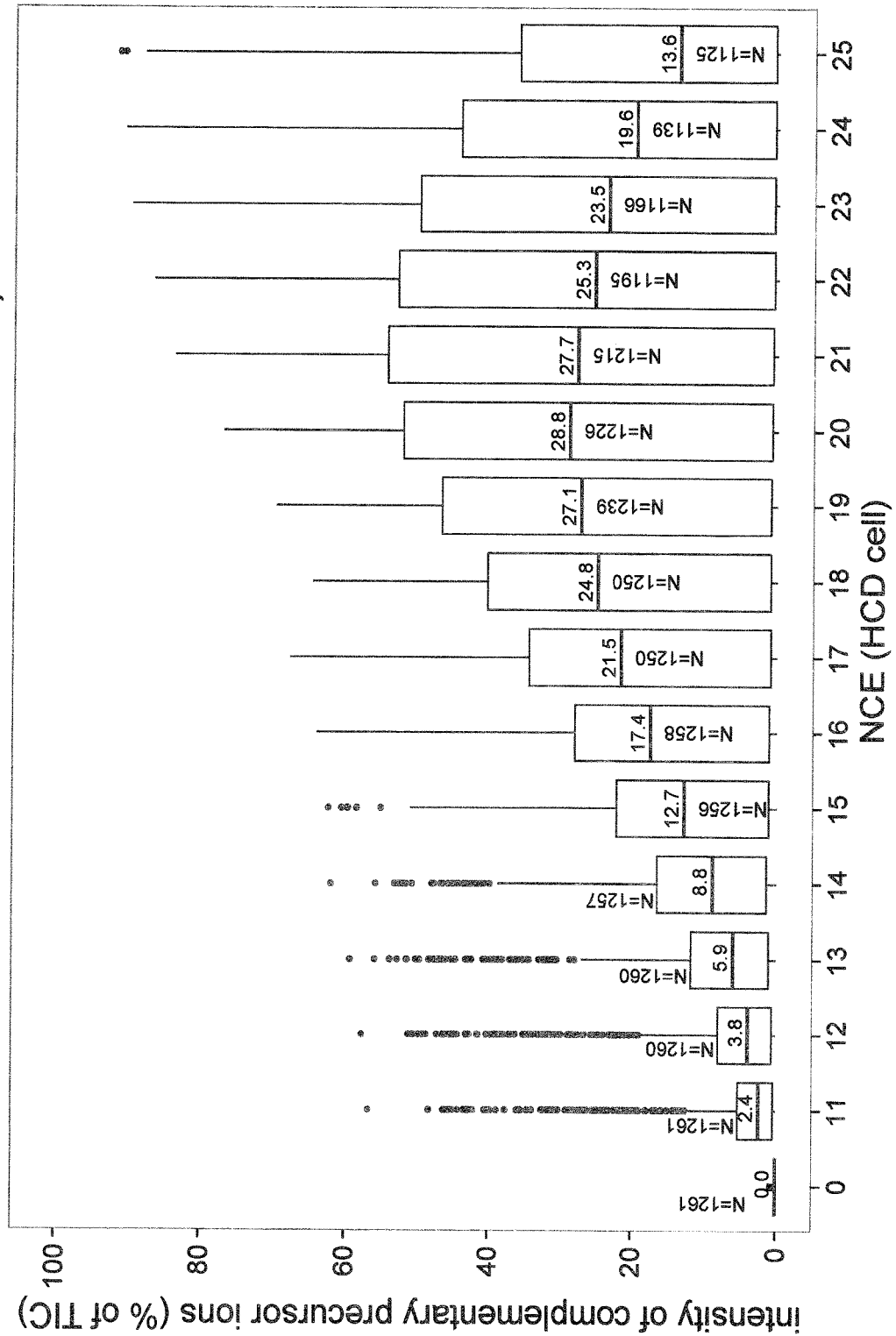

FIG. 5: ASL1 based isobaric labeling reagent(s).

Figure 6:
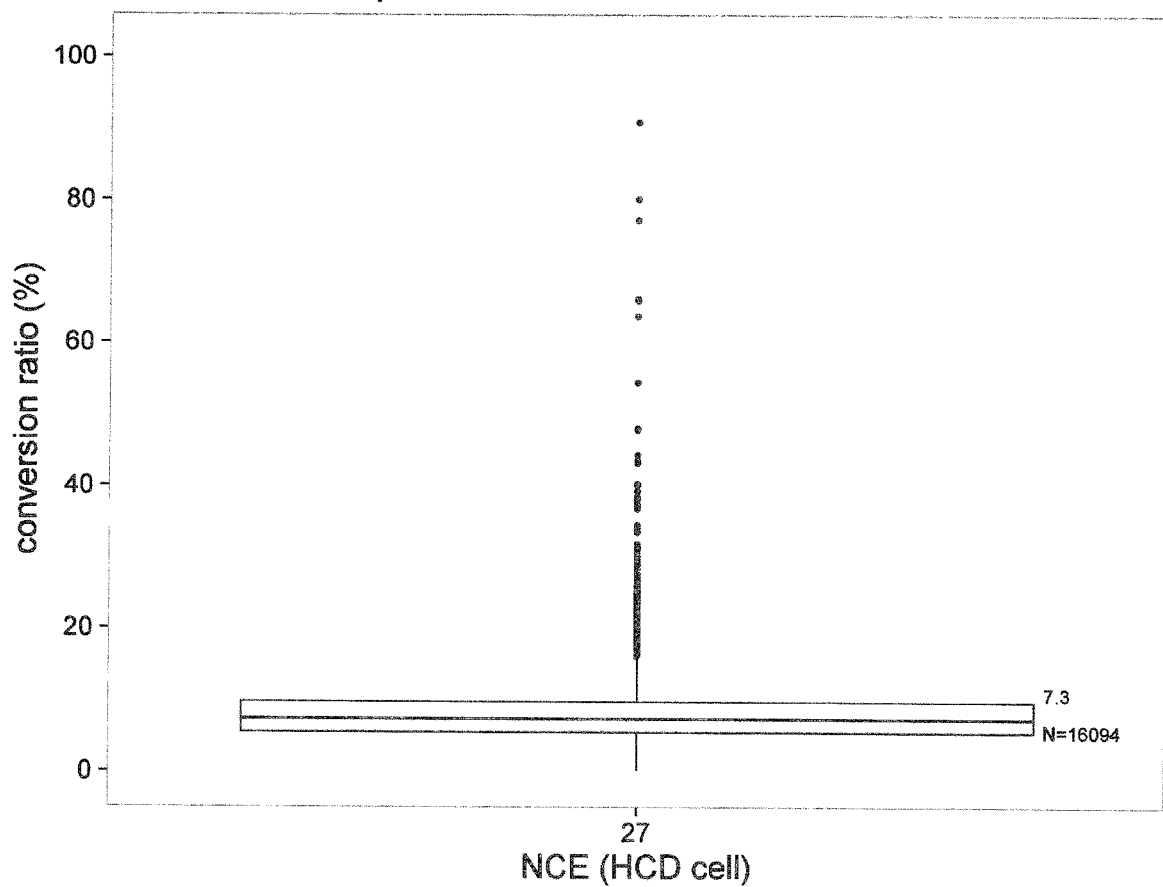
Figure 6:
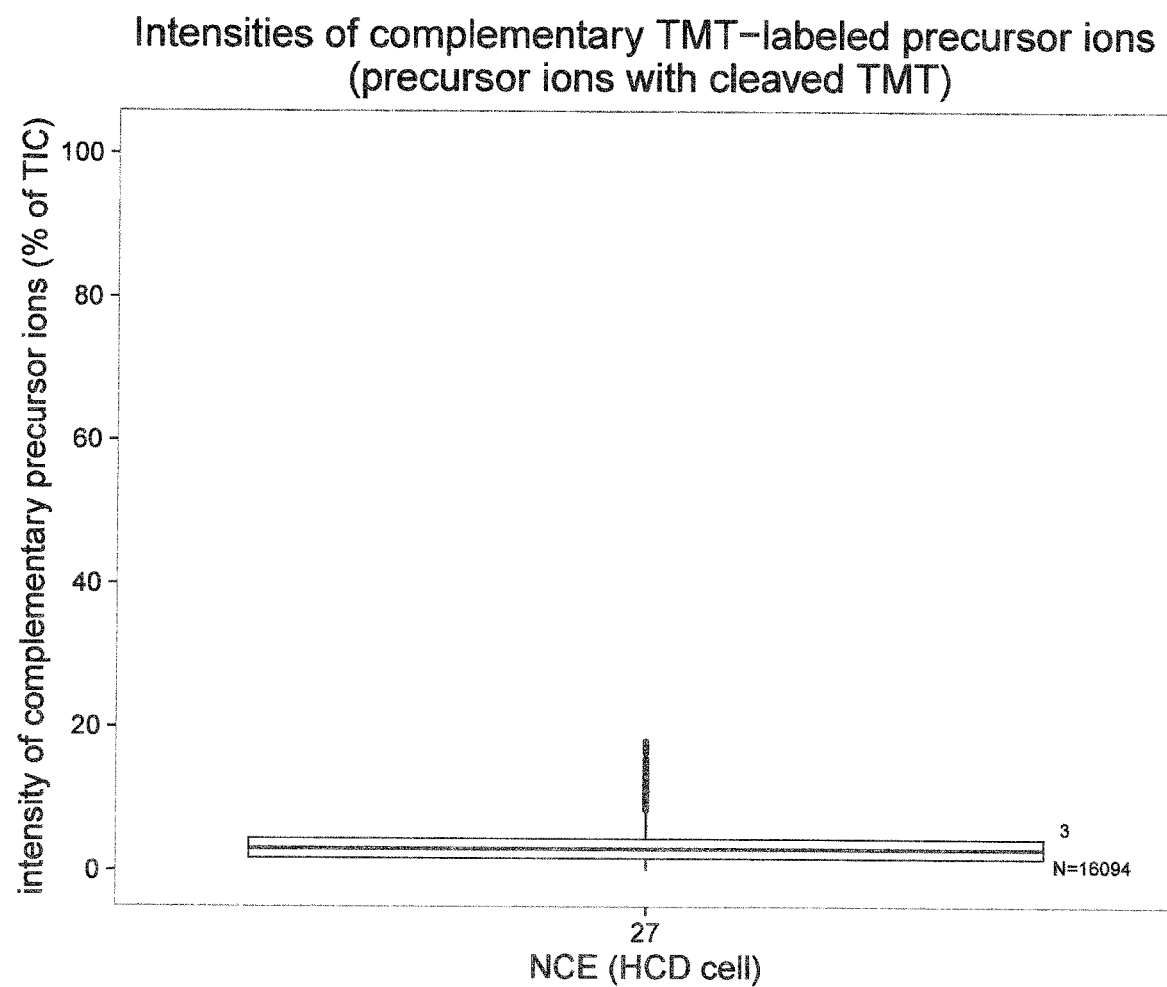
Figure 6:
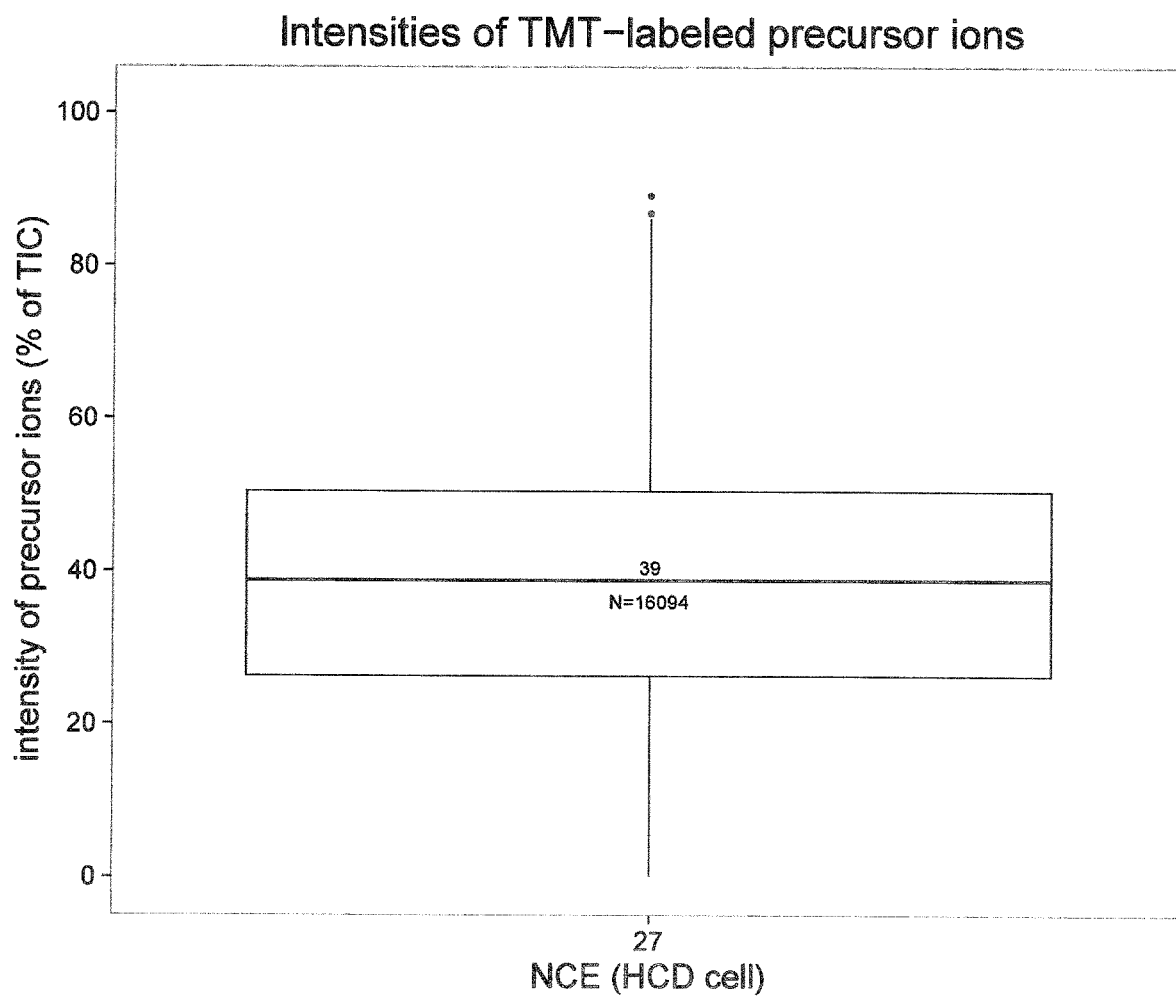

FIG. 6: Conversion of conventional TMT-labeled peptides to the complementary precursor ions.

FIG. 7: Systematic shift of the isolation window allows precise selection of only $^{12}C$ monoisotopic precursor ions.

Figure 8:
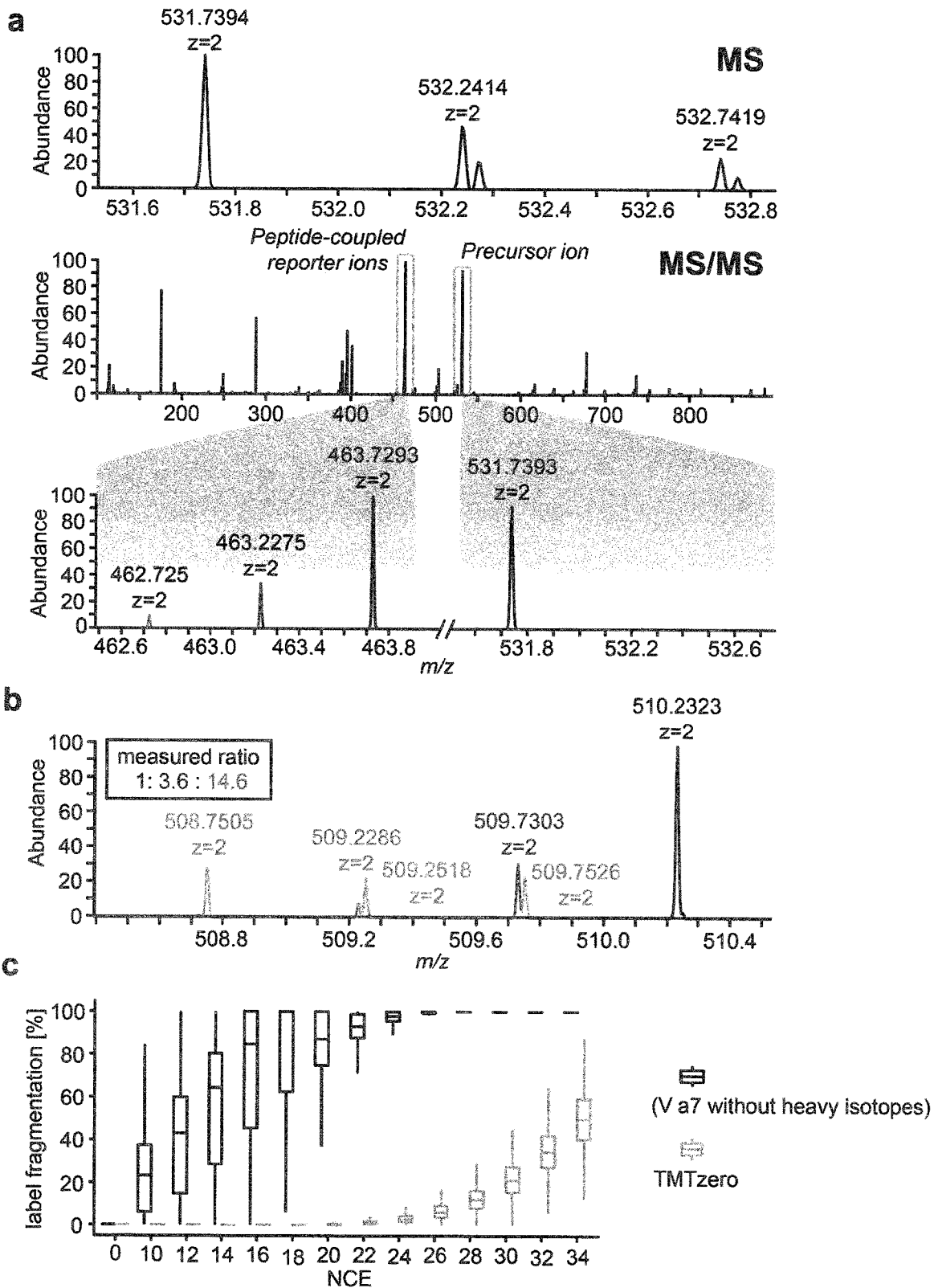

FIG. 8: Design and concept of accurate and interference-free MS2-based proteome quantification with a triplex isotope-coded compound (V a7).

Figure 9:
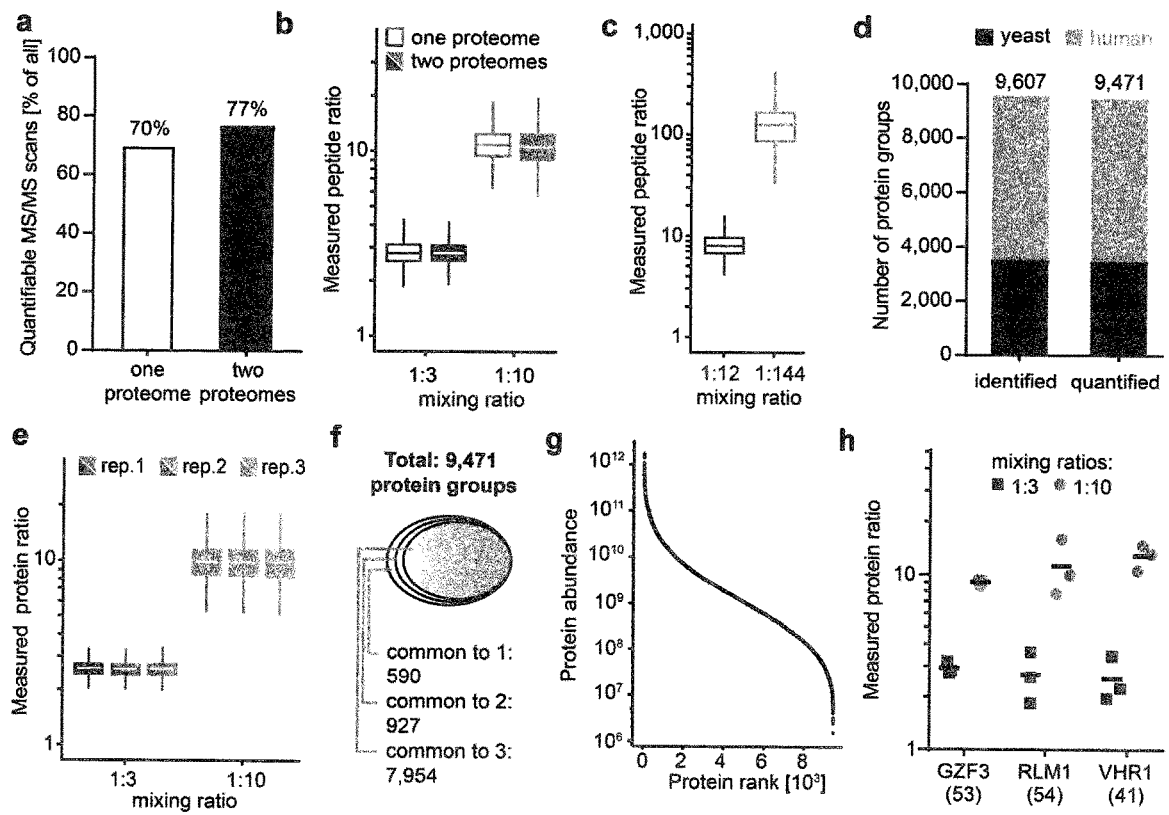

FIG. 9: Proteome-wide evaluation of multiplexed quantification with triplex isotope-coded (ASL2).

Figure 10:
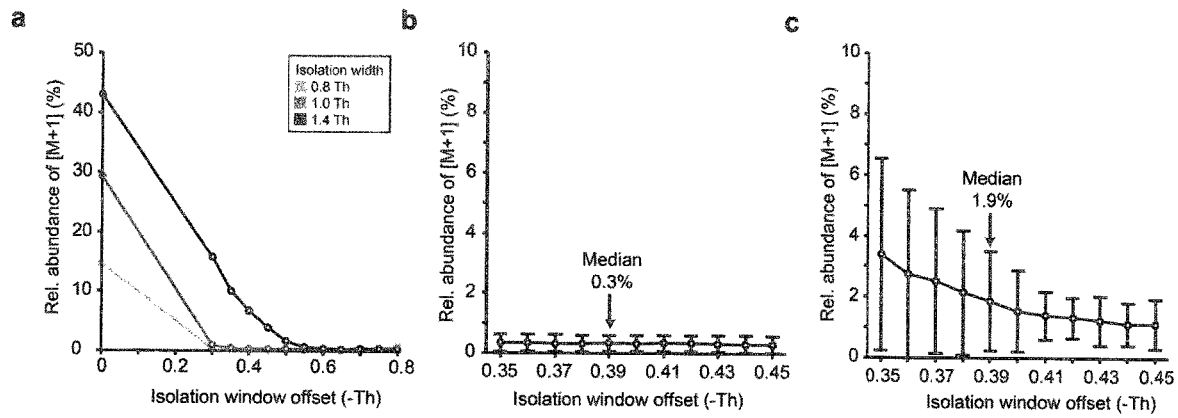

FIG. 10: Optimization of the asymmetric quadrupole isolation window shift in single run analyses of a tryptic HeLa digest.

Figure 11:
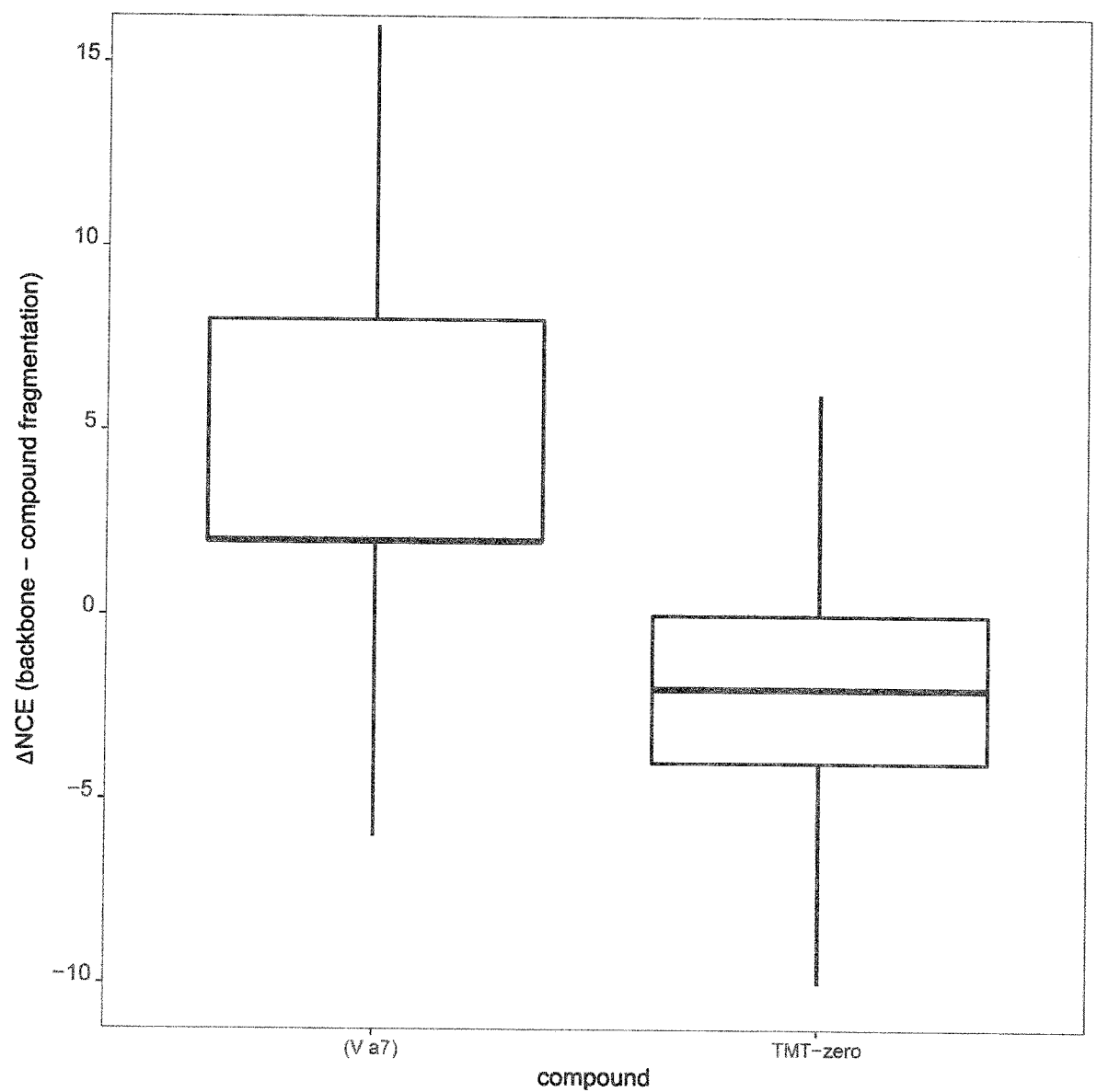

FIG. 11: Delta NCE of compound fragmentation and peptide backbone fragmentation for (V a7) and TMTzero.

Figure 12:
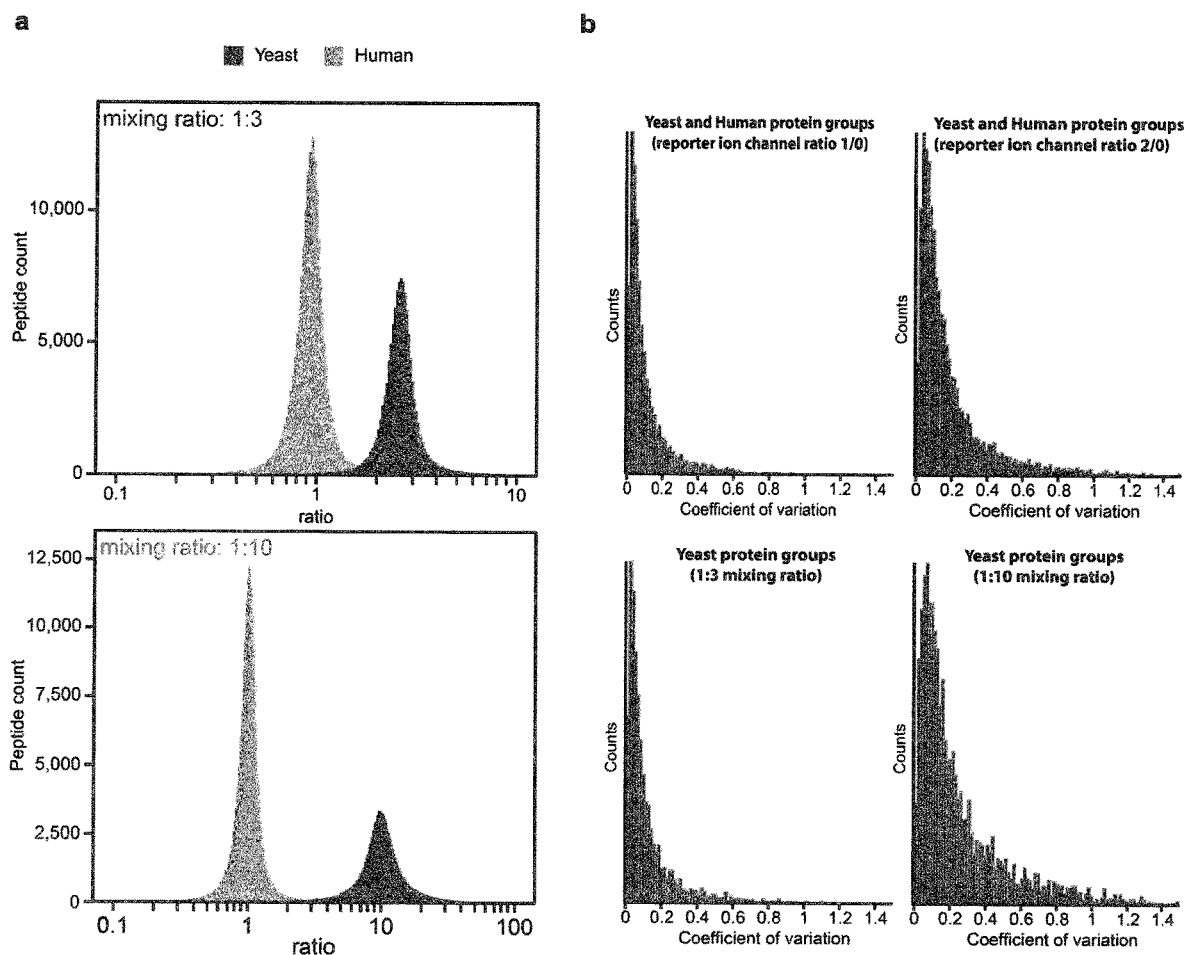

FIG. 12: In-depth quantification of digested yeast and human proteome labeled with (ASL2).

Figure 13:
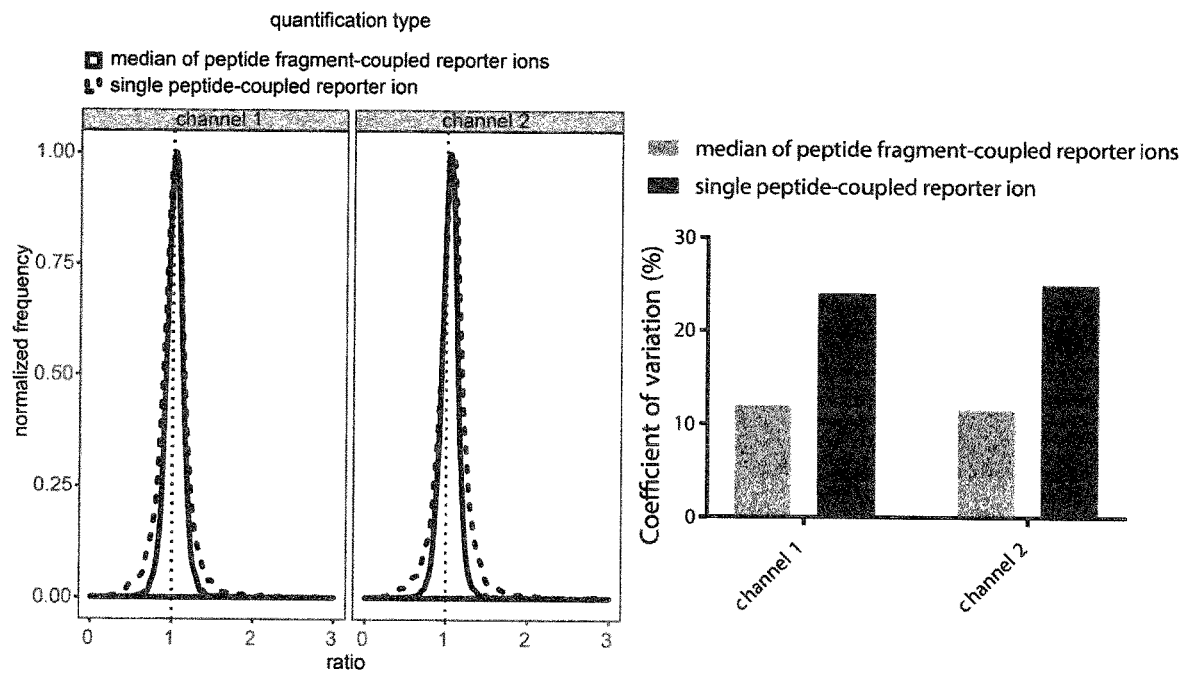

FIG. 13: Reporter quantification by using reporter ions and fragment ions.

Figure 14:
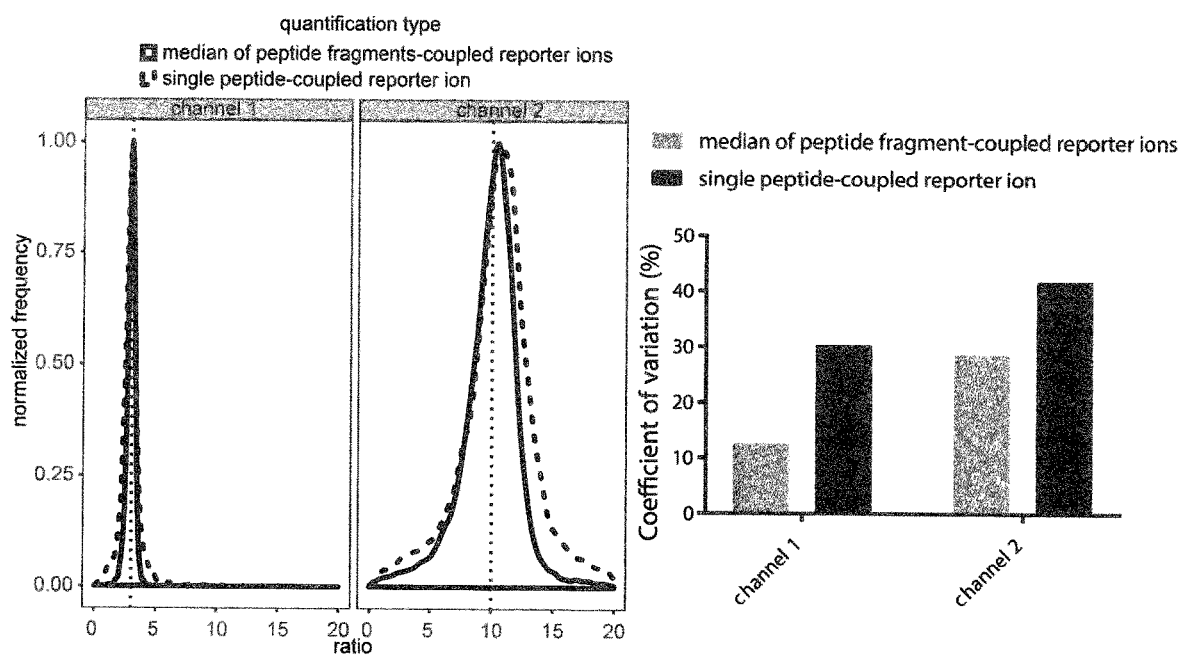

FIG. 14: Reporter quantification by using reporter ions and fragment ions.

Figure 15:
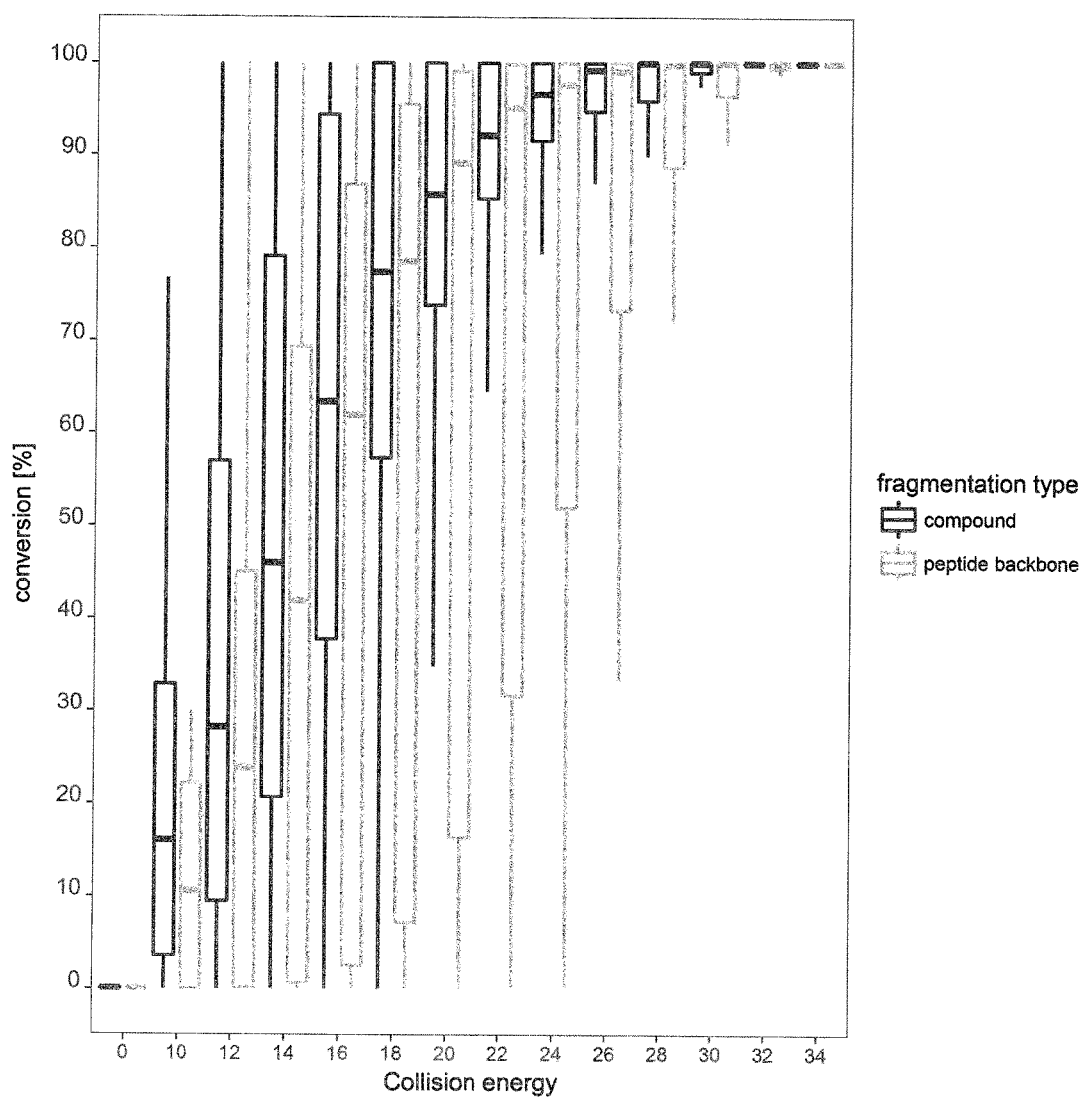

FIG. 15: Comparison of label fragmentation vs. peptide backbone fragmentation.

The examples illustrate the invention.

REFERENCE EXAMPLE 1

Symmetric Isobaric Mass Taq

The following description refers to FIG. 1.

(A1) Chemical structure of the symmetric sulfoxide linker SL1. For SL1, $R^1$=desthiobiotin and $R^2$=triazol-peg-iodoacetamide. Structures predicted to be generated upon fragmentation of SL1 are the alkene (A2, A5), the sulfenic acid (A3, A6) or the thiol fragments (A4, A7) of the $R^1$ and $R^2$ part, respectively. (B-C) SL1 was analyzed with static spray and MS spectra were recorded for m/z between 200 and 1000, with increasing SID energies stepwise by 0.5 eV from 0 to 50 eV. Ion intensities were normalized according to the total ion current of each scan and resulting intensities were divided by the maximum intensity observed for each charge state to allow plotting of ions with different abundances on the same Y-axis. (B) Relative intensity of the ions corresponding to full-length SL1 for charge states z=1 and z=2. Full-length SL1 is cleaved with increasing collision energies. (C) Relative intensities of ions corresponding to the indicated SL1 fragments.

EXAMPLE 2

Asymmetric Isobaric Mass Tag

The following description refers to FIG. 2.

(A8) Chemical structure of the asymmetric sulfoxide linker ASL1. For ASL1, $R^1$=desthiobiotin and $R^2$: peg-iodoacetamide. Cleavage of ASL1 at the sulfoxide site generates three fragments: (A9) the desthiobiotin sulfenic acid fragment, (A10) the desthiobiotin thiol fragment and (A11) the sulfhydryl alkene fragment. (B & C) ASL1 was analyzed with static spray and MS spectra were recorded for m/z between 100 and 2500, with increasing SID energies stepwise by 1 eV from 0 to 100 eV. Ion intensities were normalized according to the total ion current of each scan and resulting intensities were divided by the maximum intensity observed for each charge state to allow plotting of ions with different abundances on the same Y-axis. (B) Relative intensity of the ions corresponding to full-length ASL1 for charge states z=1 and z=2. Full-length ASL1 is cleaved with increasing collision energies. (C) Relative intensities of ions corresponding to the indicated ASL1 fragments. (D & E) ASL1 was analyzed with static spray and MS spectra were recorded for m/z between 200 and 2500, with increasing HCD energies stepwise by 1 eV from 0 to 100 eV. Ion intensities were normalized according to the total ion current of each scan and resulting intensities were divided by the maximum intensity observed for each charge state to allow plotting of ions with different abundances on the same Y-axis. (D) Relative intensity of the ions corresponding to full-length ASL1 for charge states z=1 and z=2. Full-length ASL1 is cleaved with increasing collision energies. (E) Relative intensities of ions corresponding to the indicated ASL1 fragments.

EXAMPLE 3

Conversion Rates

The following description refers to FIG. 3.

(A-C) SL1 and ASL1 were analyzed with static spray and MS spectra were recorded for m/z between 100 and 2500, with increasing SID energies stepwise by 1 eV from 0 to 100 eV. Ion intensities were normalized by the total ion current of each scan. (A) Ratios of the normalized intensities of SL1 fragments in AIF scans with the indicated energies to full SL1 in AIF scans with SID=0 eV for ions of the R1-part. A conversion rate of 0.1 indicates that 10% of the linker is present as the cleaved form and 90% is present as the full-length ion. (B) Ratios of the normalized intensities of SL1 fragments in AIF scans with the indicated energies to full SL1 in AIF scans with SID=0 eV for ions of the R2-part. (C) Ratios of the normalized intensities of ASL1 fragments in AIF scans with the indicated energies to full ASL1 in AIF scans with SID=0 eV for ions of the R1-part and R2 part. (D) ASL1 was analyzed with static spray and MS spectra were recorded for m/z between 200 and 2500, with increasing HCD energies stepwise by 1 eV from 0 to 100 eV. Ion intensities were normalized by the total ion current of each scan. Ratios of the normalized intensities of ASL1 fragments in AIF scans with the indicated energies to full ASL1 in AIF scans with SID=0 eV for ions of the R1-part and R2 part.

EXAMPLE 4

Separation of Quantification and Identification

The following description refers to FIG. 4.

ASL1-coupled peptides were measured with LC-MS and MS2 scans were performed with the indicated normalized collision energies (NCE) using the HCD cell. MS raw data was analyzed with the MaxQuant software. Ion intensities were normalized according to the total ion current of each scan. (A) Scores of all identified ASL1-coupled peptides at different NCEs. (B) Ratio of ion counts of b- and y-ions in MS2 spectra with cleaved and full ASL1. The vertical line indicates the median value. A ratio of 2 indicates that there were 2-times more b- and y-ions coupled to cleaved ASL1 than to full-length ASL1 (C) Ratio of ion intensities of b- and y-ions in MS2 spectra with cleaved and full ASL1. The vertical line indicates the median value. A ratio of 2 indicates that the b- and y-ions coupled to cleaved ASL1 were 2-times more intense than their corresponding counterparts with full-length ASL1.

EXAMPLE 5

Labeling Reagents of the Invention

The following description refers to FIG. 5.

(A) Chemical structure for isobaric labeling strategies based on ASL1 containing R1: isotope-coded mass reporter (according to TMT nomenclature but not used) and R2: isotope-coded mass balancer (corresponding to the mass reporter) and an active succinimid ester (ASL2). The linker allows triplexed quantifications, with the three precursor molecules having identical and the fragmented molecules distinct masses. (B-E) HeLa peptides were labeled with the light version (all $C_{12}$ isotopes) of ASL2. (B) Conversion ratio of the ASL2-labeled precursor ions (uncleaved peptide backbone and uncleaved linker) to the complementary precursor ions (uncleaved peptide backbone with cleaved linker) in MS2 scans with varying normalized collision energies (NCEs) using HCD. The precursor ions correspond to peptides that have been isolated for the MS2 scan without any fragmentation at the peptide backbone. A conversion ratio of 10% indicates that 10% of the precursor ions contain cleaved ASL2 and 90% full-length ASL2 (C) Intensities of ASL2-labeled precursor ions, expressed as % of the total ion current (TIC), in MS2 scans with varying NCEs using HCD. (D) Intensities of the complementary ASL2-labeled precursor ions in MS2 scans with varying NCEs using HCD (E) Intensities of the complementary ASL2-labeled precursor ions, expressed as % of the total ion current (TIC), in MS2 scans with varying NCEs using HCD.

EXAMPLE 6

Comparison with TMT Mass Tag

The following description refers to FIG. 6.

(A-C) HeLa peptides were labeled with conventional TMT duplex. Conversion ratio of the TMT-labeled precursor ions to the complementary precursor ions in MS2 scans at a normalized collision energy (NCE) of 27 using HCD. The precursor ions correspond to peptides that have been isolated for the MS2 scan without any fragmentation at the peptide backbone. A conversion ratio of 10% indicates that 10% of the precursor ions contain cleaved ASL2 and 90% full-length ASL2 The precursor ion corresponds to the peptide that has been isolated for the MS2 scan without any fragmentation at the peptide backbone. (B) Intensities of the complementary TMT-labeled precursor ions, expressed as % of the total ion current (TIC), in MS2 scans with an NCE of 27 using HCD. (C) Intensities of TMT-labeled precursor ions, expressed as % of the total ion current (TIC), in MS2 scans with varying NCEs using HCD.

EXAMPLE 7

Optimization of Isolation Window

The following description refers to FIG. 7.

(A) Full scan with a double charged z=2 peptide species. (B) Isolation with a 0.8 Th isolation window, centered. (C) Full scan with a triple charged z=3 peptide species. (D) Isolation with a 0.4 Th isolation window, centered. (E) Full scan with a triple charged z=3 peptide species. (F) Isolation with a 0.4 Th isolation window, −0.1 Th offset.

EXAMPLE 8

The following description refers to FIG. 8.

(a) Mass spectra of an (V a7)-labeled yeast peptide mixed in a ratio of 1:3:10. HCD fragmentation of the doubly charged precursor ion abstracts the neutral loss group and yields the peptide-coupled reporter ion cluster. (b) The precursor mass information is retained in the peptide-coupled reporter ions for (V a7)-labeled peptides. Colored peaks indicate the peptide-coupled reporter ions from an identified yeast peptide in a two proteome experiment (mixing ratios: 1:3:10 for yeast & 1:1:1 for human). Grey peaks are peptide-coupled reporter ions from a co-isolated peptide. (c) (V a7 without heavy isotopes) and TMT-zero-labeled HeLa peptides were fragmented with normalized collision energies between 10 and 34. (N=17,565 precursors for (V a7) & 20,610 for TMT)

EXAMPLE 9

The following description refers to FIG. 9.

(a) MS/MS scans in the one proteome/two proteomes experiments with intensity signals in at least two peptide-coupled reporter channels. (b) Quantified peptide-coupled reporter ion ratios (log 10) of yeast peptides mixed in a 1:3:10 ratio in the absence or presence of a HeLa background proteome (mixed 1:1:1) in a single run LC-MS/MS experiment (N=7,419 scans & 3,055 scans for the 1:3 mixing ratio and N=6,729 scans & 2,622 scans for the 1:10 mixing ratio). (c) Quantified peptide-coupled reporter ion ratios (log 10) of yeast peptides mixed in a 1:12:144 ratio in a single run LC-MS/MS experiment (N=6,606 scans for the 1:12 mixing ratio and N=2,642 scans for the 1:144 mixing ratio). (d) A total of 9,607 protein groups were identified in 16 high pH fractionations of the mixed yeast/HeLa two proteome model in triplicate LC-MS/MS runs. Out of these, 9,471 protein groups were quantified with intensity signals in at least two peptide-coupled reporter channels. (e) Ratio distribution (log 10) of quantified yeast protein groups from (d) (N=3,160, 3,212, 3,139 for the 1:3 mixing ratio and N=3,022, 3,059, 2,990 for the 1:10 mixing ratio). (f) 92% (8,881) of the identified protein groups were quantified in at least two replicate experiments. (g) Ranked abundance of yeast and human protein groups quantified with (ASL2). (g) Accurate quantification of low abundant proteins such as yeast transcription factors with (ASL2). Estimated copy numbers from Kulak et al. 20 are indicated in parenthesis.

EXAMPLE 10

The following description refers to FIG. 10.

(a) Median abundance of the M+1 isotopic peak relative to the monoisotopic precursor ion as a function of the isolation window offset for isolation widths of 0.8 Th (N=2,076), 1.0 Th (N=2,070) and 1.4 Th (N=2,041). (b) As above for an isolation width of 0.8 Th and displaying only doubly charged precursor ions (N=1,476). (c) As in panel c, displaying only triply charged precursors (N=284). Error bars indicate+/−interquartile range. Zero intensity values were excluded from the statistics.

EXAMPLE 11

The following description refers to FIG. 11.

(a) (V a7)- and TMT-zero-labeled HeLa peptides were fragmented with normalized collision energies between 10 and 34. ANCE was calculated as the difference of compound fragmentation versus peptide backbone fragmentation (N=6, 523 precursors for (V a7) and 13,067 for TMT-zero). The NCE of the compound fragmentation (also called compound conversion) was defined as the minimal NCE at which the compound fragmented to at least 30%. Compound fragmentation was calculated by dividing the intensity of the peptide-coupled reporter ion (fragmented compound coupled to the non-fragmented peptide) by the summed intensities of the precursor ions (non-fragmented peptide) with intact and fragmented compound. If compound fragmentation did not reach 30%, the NCE of the compound fragmentation was defined as the NCE of the maximal compound fragmentation. The NCE of peptide backbone fragmentation (also called peptide backbone conversion) was defined as the NCE at which the sum of all fragment ions (b and y ions) reached 30% of the summed intensities of peptide fragments and peptide precursor ions (b and y ions and precursor ions). If peptide backbone fragmentation never reached above 30%, the NCE of peptide backbone fragmentation was defined as the NCE at which the peptide backbone fragmentation reached its maximum. Precursors with an NCE of peptide backbone fragmentation of NCE 10 or NCE 34 or a charge state below 2 or above 3 were excluded from the analysis.

EXAMPLE 12

The following description refers to FIG. 12.

(a) Distribution of peptide-coupled reporter ion ratios (log 10) in MS/MS scans of yeast (mixing ratio 1:3:10) and human (mixing ratio 1:1:1) peptides (N=198,307/122,335 for human/yeast in the upper panel and N=197,939/101,496 for human/yeast in the lower panel). (b) Distribution of the coefficients of variation for (ASL2)-labeled and quantified yeast and human protein groups in three replicate injections (N=8856/8705 for yeast and human and N=3287/3152 for yeast).

EXAMPLE 13

The following description refers to FIG. 13.

(a) HeLa proteome was labeled with ASL2 and mixed at a ratio of 1:1:1 (channel 1:channel2:channel3). Ratios of individual HeLa peptides were calculated by dividing the signal intensity in the channel 3 by the intensities in the other channels. Ratios were calculated either by using only the reporter ion (i.e. precursor ion with neutral loss) or by taking quantitative information from all fragment ions with a neutral loss. (b) Coefficients of variation (CVs) were calculated for each channel and method of quantification. CVs are reduced by using quantitative information from multiple fragment ions.

EXAMPLE 14

The following description refers to FIG. 14.

(a) HeLa proteome was labeled with ASL2 and mixed at a ratio of 1:3:10 (channel 1:channel2:channel3). Ratios of individual HeLa peptides were calculated by dividing the signal intensity in the channel 3 by the intensities in the other channels. Ratios were calculated either by using only the reporter ion (i.e. precursor ion with neutral loss) or by taking quantitative information from all fragment ions with a neutral loss. (b) Coefficients of variation (CVs) were calculated for each channel and method of quantification. CVs are reduced by using quantitative information from multiple fragment ions.

EXAMPLE 15

The following description refers to FIG. 15.

(a) (V a7, unlabeled triplex)-labeled HeLa peptides were fragmented with normalized collision energies between 10 and 34. The percentage of compound fragmentation (also called compound conversion) was calculated by dividing the intensity of the peptide-coupled reporter ion (fragmented compound coupled to the non-fragmented peptide) by the summed intensities of the precursor ions (non-fragmented peptide) with intact and fragmented compound. The percentage of peptide backbone fragmentation (also called peptide backbone conversion) was calculated by dividing the sum of all fragment ions (b and y ions with intact and fragmented compound) by the summed intensities of peptide fragment ions and peptide precursor ions (summed intensities of b and y and precursor ions with intact and fragmented compound). Precursors with an NCE of peptide backbone fragmentation (see Example 11) of NCE 10 or NCE 34 or a charge state below 2 or above 3 were excluded from the analysis. (N=6,509 precursors for compound fragmentation and N=6,511 precursors for peptide backbone fragmentation).

The invention claimed is:

1. A compound which comprises or consists of
   (a) a reactive moiety (a), said reactive moiety (a) being capable of reacting with a functional group of a peptide to form a covalent bond, and covalently joined thereto; and
   (b) a moiety (b) which fragments in the mass spectrometer
      (i) at an energy below the energy required for fragmenting peptides and/or a higher conversion rate than peptides; and
      (ii) at said energy according to (i), and when coupled to a peptide via said reactive moiety (a), fragments at a single site within said compound coupled to said peptide, to yield a first moiety and a second moiety, said second moiety being coupled to said peptide;

wherein said compound has formula (V a) or (V b):

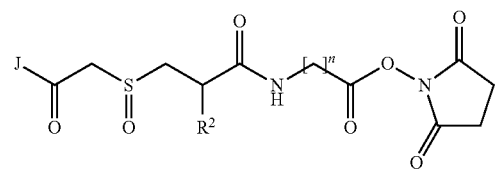

(V a)

wherein $R^2$ is hydrogen or an electron-withdrawing group selected from halogen, $NH_3^+$, $NR^3R^4R^{5+}$, or $NO_2$, and wherein $R^3$, $R^4$ and $R^5$ are independently $C_1$ to $C_6$ alkyl or cycloalkyl, $C_2$ to $C_6$ alkenyl or cycloalkenyl or $C_2$ to $C_6$ alkinyl;

J is a moiety containing C and optionally N and/or O, optionally wherein one or more of said C, N, or O is isotope labelled; wherein said moiety J is selected from substituted or unsubstituted $C_1$ to $C_6$ alkyl or cycloalkyl, substituted or unsubstituted $C_2$ to $C_6$ alkenyl or cycloalkenyl, or substituted or unsubstituted $C_2$ to $C_6$ alkinyl, wherein 1 or 2 carbon atoms may be replaced with heteroatoms selected from O, N, S and P, substituents including OH, halogen, methyl and methoxy, and optionally $H_3C-(CH_2)_r-O$;

n is an integer number between 0 and 19;

r is an integer number between 0 and 20; or

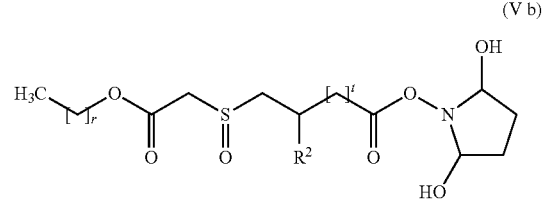

(V b)

wherein $R^2$ is an electron-withdrawing group selected from halogen, $NH_3^+$, $NR^3R^4R^{5+}$, or $NO_2$, wherein $R^3$, $R^4$ and $R^5$ are independently $C_1$ to $C_6$ alkyl or cycloalkyl, $C_2$ to $C_6$ alkenyl or cycloalkenyl or $C_2$ to $C_6$ alkinyl; and r and t independently are integer numbers between 1 and 20.

2. The compound of claim 1, wherein said compound is isotope labeled and optionally comprises one, two, three, four, five, six, seven, eight, nine or ten isotope labeled atoms.

3. The compound of claim 1, wherein said first moiety formed upon said fragmenting of said moiety (b) is not charged.

4. The compound of claim 1 wherein J is $H_3C-(CH_2)_r-O$, wherein r is an integer number between 0 and 20.

5. The compound of claim 2, wherein said compound is isotope labeled and said isotope labeled atoms are selected from at least one of 13C and 15N.

* * * * *